(12) United States Patent
McCann et al.

(10) Patent No.: US 9,013,430 B2
(45) Date of Patent: Apr. 21, 2015

(54) HAND AND FINGER REGISTRATION FOR CONTROL APPLICATIONS

(75) Inventors: Eric McCann, Acton, MA (US); Mark J. Micire, Felton, CA (US); Holly A. Yanco, Sudbury, MA (US); Adam D. Norton, Lowell, MA (US)

(73) Assignee: University of Massachusetts, Boston, MA (US)

( * ) Notice: Subject to any disclaimer, the term of this patent is extended or adjusted under 35 U.S.C. 154(b) by 101 days.

(21) Appl. No.: 13/818,007

(22) PCT Filed: Jun. 22, 2011

(86) PCT No.: PCT/US2011/041435
§ 371 (c)(1),
(2), (4) Date: Apr. 30, 2013

(87) PCT Pub. No.: WO2012/024022
PCT Pub. Date: Feb. 23, 2012

(65) Prior Publication Data
US 2013/0207920 A1     Aug. 15, 2013

Related U.S. Application Data

(60) Provisional application No. 61/375,483, filed on Aug. 20, 2010, provisional application No. 61/442,395, filed on Feb. 14, 2011.

(51) Int. Cl.
*G06F 3/041* (2006.01)
*G06F 3/0488* (2013.01)
*G06K 9/00* (2006.01)

(52) U.S. Cl.
CPC .......... *G06F 3/0488* (2013.01); *G06F 3/04883* (2013.01); *G06K 9/00355* (2013.01)

(58) Field of Classification Search
None
See application file for complete search history.

(56) References Cited

U.S. PATENT DOCUMENTS

| 6,888,536 | B2 * | 5/2005 | Westerman et al. | 345/173 |
| 8,502,787 | B2 * | 8/2013 | Rigazio et al. | 345/173 |
| 2006/0026535 | A1 * | 2/2006 | Hotelling et al. | 715/863 |
| 2008/0168403 | A1 | 7/2008 | Westerman et al. | |
| 2008/0181459 | A1 * | 7/2008 | Martin et al. | 382/103 |
| 2009/0027330 | A1 | 1/2009 | Aida | |

(Continued)

FOREIGN PATENT DOCUMENTS

WO    WO 2007089766 A2    8/2007

OTHER PUBLICATIONS

International Search Report and Written Opinion dated Jun. 22, 2011 from corresponding International Application No. PCT/US2011/041435.

(Continued)

*Primary Examiner* — Joseph Haley
(74) *Attorney, Agent, or Firm* — Wolf, Greenfield & Sacks, P.C.

(57) ABSTRACT

Robot control typically requires many physical joysticks, buttons and switches. We have created a dynamically resizing, ergonomic, and multi-touch (DREAM) controller that enables a software-based operator control unit (SoftOCU) using a multi-touch screen. The DREAM controller can be formed wherever a person places his or her hand on a touch screen. We have also developed an algorithm for accurate hand and finger registration that can be used to create the DREAM controller.

21 Claims, 15 Drawing Sheets

(56) References Cited

U.S. PATENT DOCUMENTS

2010/0031202 A1    2/2010  Morris et al.
2010/0302155 A1*  12/2010  Sands et al. ................... 345/163

OTHER PUBLICATIONS

Agarwal, A. et al., High Precision Multi-touch Sensing on Surfaces Using Overhead Cameras. In Second IEEE International Workshop on Horizontal Interactive Human-Computer Systems (Tabletop 2007), pp. 197-200, 2007.

Courtemanche, A. et al., Human-Robot Interaction using a Multi-Touch Display. 2nd Annual IEEE Tabletop Workshop, poster presentation, Oct. 2007.

Dang, C. et al., Hand Distinction for Multi-touch Tabletop Interaction. In Proceedings of the ACM International Conference on Interactive Tabletops and Surfaces, pp. 101-108. ACM, 2009.

Häger-Ross, C. et al., Quantifying the Independence of Human Finger Movements: Comparisons of Digits, Hands, and Movement Frequencies. Journal of Neuroscience, 20(22):8542, 2000.

Izadi, S. et al., C-Slate: A Multi-Touch and Object Recognition System for Remote Collaboration using Horizontal Surfaces. Second IEEE International Workshop on Horizontal Interactive Human-Computer Systems (Tabletop 2007), 7, 2007.

Keyes, Brenden et al. Improving Human-Robot Interaction through Interface Evolution. Human-Robot Interaction, Daisuke Chugo (Ed.), INTECH, 2010.

Matejka, J. et al., The Design and Evaluation of Multi-finger Mouse Emulation Techniques. In Proceedings of the 27th International Conference on Human Factors in Computing Systems. pp. 1073-1082. ACM, 2009.

Micire, M. et al., Hand and Finger Registration for Multi-Touch Joysticks on Software-Based Operator Control Units. Proceedings of the IEEE International Conference on Technologies for Practical Robot Applications, Woburn, MA, Apr. 2011.

Micire, M. et al. Multi-Touch Interaction for Robot Control. International Conference on Intelligent User Interfaces (IUI), Sanibel Island, Florida, Feb. 8-11, 2009.

Micire, M. et al., Performance of Multi-Touch Table Interaction and Physically Situated Robot Agents. Poster presentation at the 3rd ACM/IEEE International Conference on Human-Robot Interaction, Amsterdam, Mar. 2008.

Micire, M. et al. Analysis of Natural Gestures for Controlling Robot Teams on Multi-touch Tabletop Surfaces. ACM International Conference on Interactive Tabletops and Surfaces, Banff, Alberta, Nov. 23-25, 2009.

Micire, M. et al. Design and Validation of Two-Handed Multi-Touch Tabletop Controllers for Robot Teleoperation. Proceedings of the International Conference on Intelligent User Interfaces, Palo Alto, CA, Feb. 13-16, 2011.

Saffer, D., Designing Gestural Interfaces: Touchscreens and Interactive Devices. O'Reilly Media, Nov. 26, 2008.

Scott, S. et al., Territoriality in Collaborative Tabletop Workspaces. In Proceedings of the 2004 ACM Conference on Computer Supported Cooperative Work (CSCW), pp. 294-303. ACM, 2004.

Wang, F. et al., Detecting and Leveraging Finger Orientation for Interaction with Direct-touch Surfaces. In Proceedings of the 22nd Annual ACM Symposium on User Interface Software and Technology (UIST), pp. 23-32. ACM, 2009.

Wobbrock, J. et al., User-defined Gestures for Surface Computing. In Conference on Human Factors in Computing Systems, 2009.

Yanco, H. et al., Microsoft Research External Research Symposium, Apr. 2010, poster presentation.

* cited by examiner

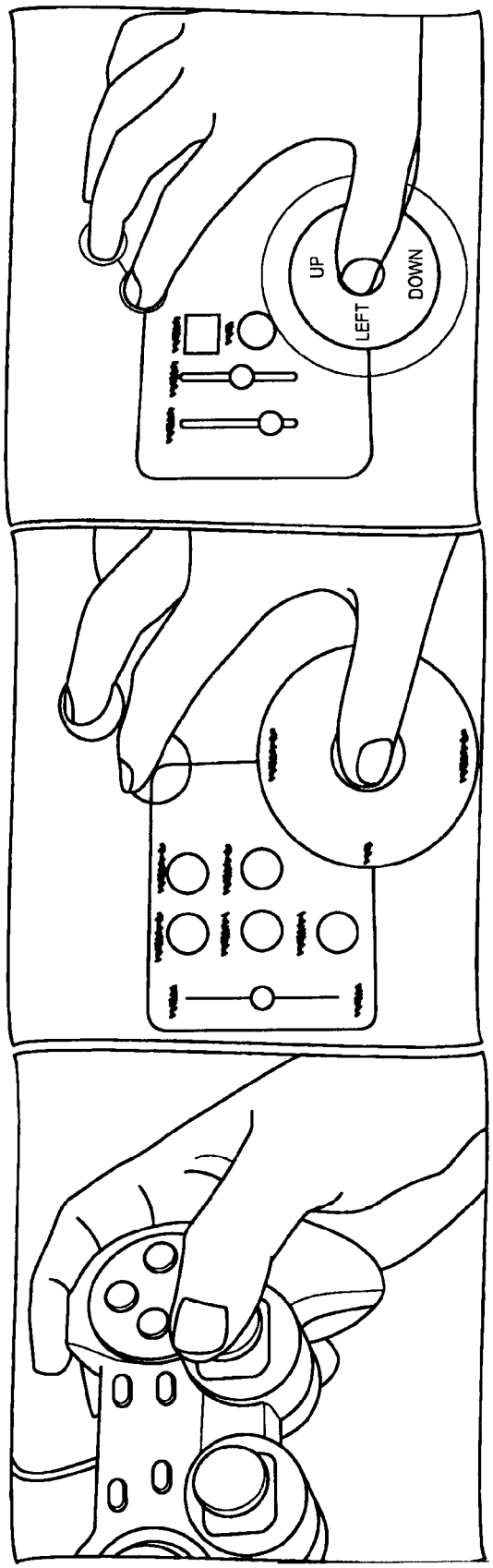

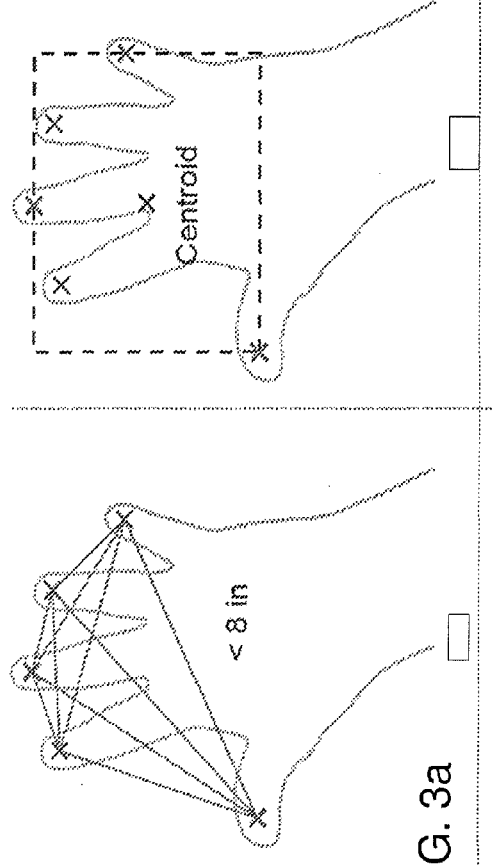
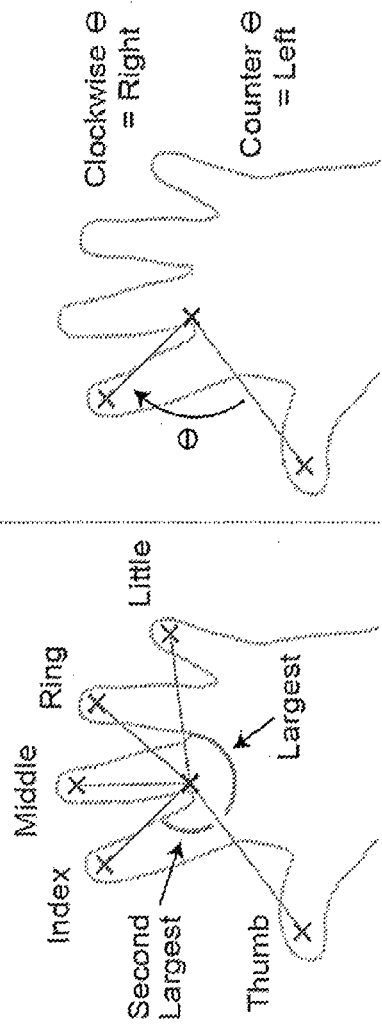
FIG. 3a  FIG. 3b  FIG. 3c  FIG. 3d

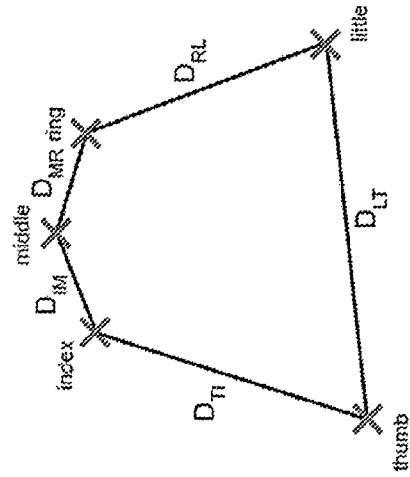
Fig. 5e
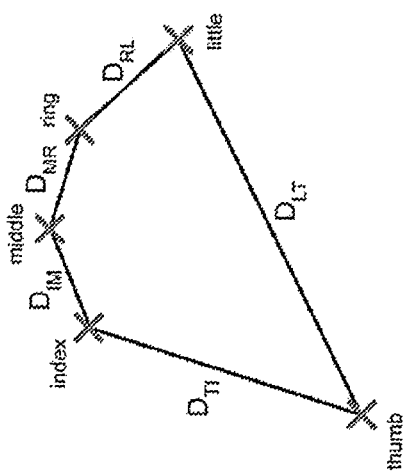
Fig. 5g
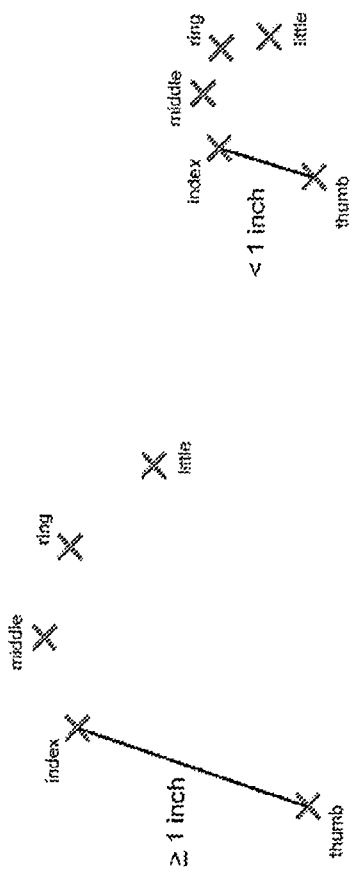
Fig. 5f
Fig. 5h

HAND AND FINGER REGISTRATION FOR CONTROL APPLICATIONS

RELATED APPLICATIONS

This application is a national stage application under 35 U.S.C. §371 of International Application No. PCT/US2011/041435, filed on Jun. 22, 2011, which claims priority to U.S. Provisional Application No. 61/375,483 filed Aug. 20, 2010, titled HAND AND FINGER REGISTRATION FOR CONTROL APPLICATIONS, and U.S. Provisional Application No. 61/442,395, filed Feb. 14, 2011, titled HAND AND FINGER REGISTRATION FOR CONTROL APPLICATIONS, each of which is hereby incorporated by reference in its entirety.

STATEMENT OF GOVERNMENT SUPPORT

This invention was made with government support under Grant Nos. IIS-0546309 awarded by the National Science Foundation. The government has certain rights in this invention.

BACKGROUND

In some applications, robots or other devices are operated by a remote operator who manipulates various controls of a control unit. Based on the input received from the operator, the control unit sends commands to the robot which cause the robot to move or take other action. Such a technique is known as robot teleoperation. Teleoperation allows the operator of the robot to be positioned at a safe location remote from the robot or other device when it operates in a dangerous environment. For example, some applications of robot teleopration include explosive ordinance disposal (EOD) and search and rescue (SAR) operations.

There are several ways to control the movement of the robot and all of the various sensors, effectors, and lighting systems. The most common method involves a mix of a large number of joysticks, switches, and dials that each manage some degree of freedom or functionality (e.g., such as the controller for QinetiQ TALON robot illustrated in FIG. 1a). These controls are physical entities that can provide tactile feedback to the operator. Operators will often employ a technique called "chording" to operate multiple controls simultaneously. In the same way that a piano player can use multiple finger positions to create a harmonic chord having multiple complimentary notes, the robot operator can use all fingers available to manage complex and coordinated movement of the robot.

For example, while using the QinetiQ TALON EOD robot, an operator may use his or her left thumb on a two degree of freedom joystick to drive the robot left, right, forward or backwards. The index finger is used to push up and down on a dial that scales and governs the speed of the robot. The robot may need to move rapidly when traveling down range, but once it is close to the bomb or victim, it may need to move very slowly and deliberately. Above the drive controls, several switches are toggled with the middle, ring, or little finger to control light intensity, laser range sighting, and other onboard systems. As complex as this arrangement may seem, a cluster of almost identical controls are situated for the right hand where camera control, manipulator control, disruptor engagement, and sensors can all be manipulated. Although there is a large variety of robot configurations and capabilities in the field, it is not uncommon to see a robot operator managing controls for as many as ten or more degrees of freedom for a single robot platform.

In physical operator control units (OCUs) such as the one discussed above, one disadvantage is that the control layout is static and redesign to change the layout or add functionality can be quite costly.

SUMMARY

Some embodiments relate to a method of providing a graphical user interface. The method includes identifying which fingers of a hand correspond to a plurality of points, and displaying the graphical user interface based on positions of the plurality of points and information identifying which fingers of the hand correspond to the plurality of points.

Some embodiments relate to a method of identifying one or more fingers of a hand. The method includes calculating a center position of the hand based at least on points corresponding to a plurality of the fingers, calculating angles between the points based at least on positions of the points and the center position of the hand, and identifying, based on the angles, which one or more fingers of the hand correspond to one or more of the points.

Some embodiments relate to a method of determining whether fingers correspond to a right hand or a left hand. The method includes determining a first vector along a first direction between a first point, corresponding to a first finger, and a second point corresponding to a center of a hand, determining a second vector along a second direction between a third point, corresponding to a second finger, and the second point, calculating a cross product between the first and second vectors, and determining whether the fingers correspond to a right hand or a left hand based on the cross product.

Some embodiments relate to a method of determining whether fingers correspond to a right hand or a left hand. The method includes identifying a first finger of a hand as corresponding to a first point, identifying a second finger of the hand as corresponding to a second point, determining a third point representing a center position of the hand, and determining whether the hand is a right hand or a left hand based on the first, second and third points.

Some embodiments relate to at least one computer readable storage medium having stored thereon instructions, which, when executed, perform one or more of the above methods. The methods described herein may be implemented using a microprocessor.

Some embodiments relate to a device for identifying fingers. The device includes an apparatus that detects points corresponding to a plurality of fingers of a hand; and a microprocessor that determines, based on angles between the points corresponding to different fingers, which one or more fingers of the hand correspond to one or more of the points.

The foregoing summary is provided for purposes of illustration and is not intended to be limiting.

BRIEF DESCRIPTION OF THE DRAWINGS

The skilled artisan will understand that the figures, described herein, are for illustration purposes only. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 2a shows an example of a conventional video game controller.

FIG. 2b shows a prototype of a graphical user interface for a multi-touch controller.

FIG. 2c shows an example of a graphical user interface implemented using a multi touch panel, according to some embodiments.

FIGS. 3a-3d illustrate the steps of a hand and finger registration method, according to a first embodiment.

FIGS. 5a-5h show an example of a hand and finger registration method, according to a second embodiment.

DETAILED DESCRIPTION

Figure 1A:
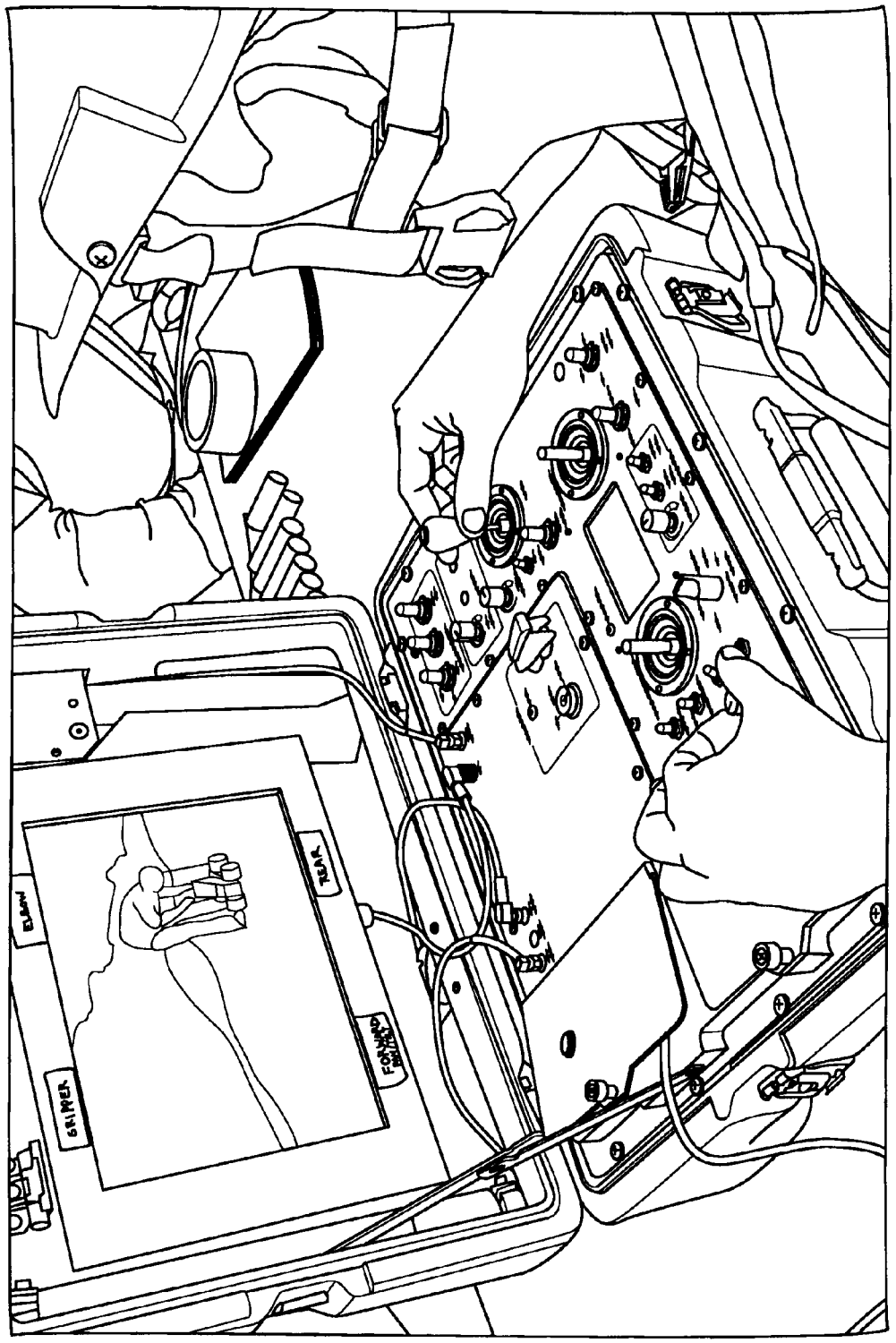
FIG. 1a shows an example of a conventional physical robot control interface.
Figure 1B:
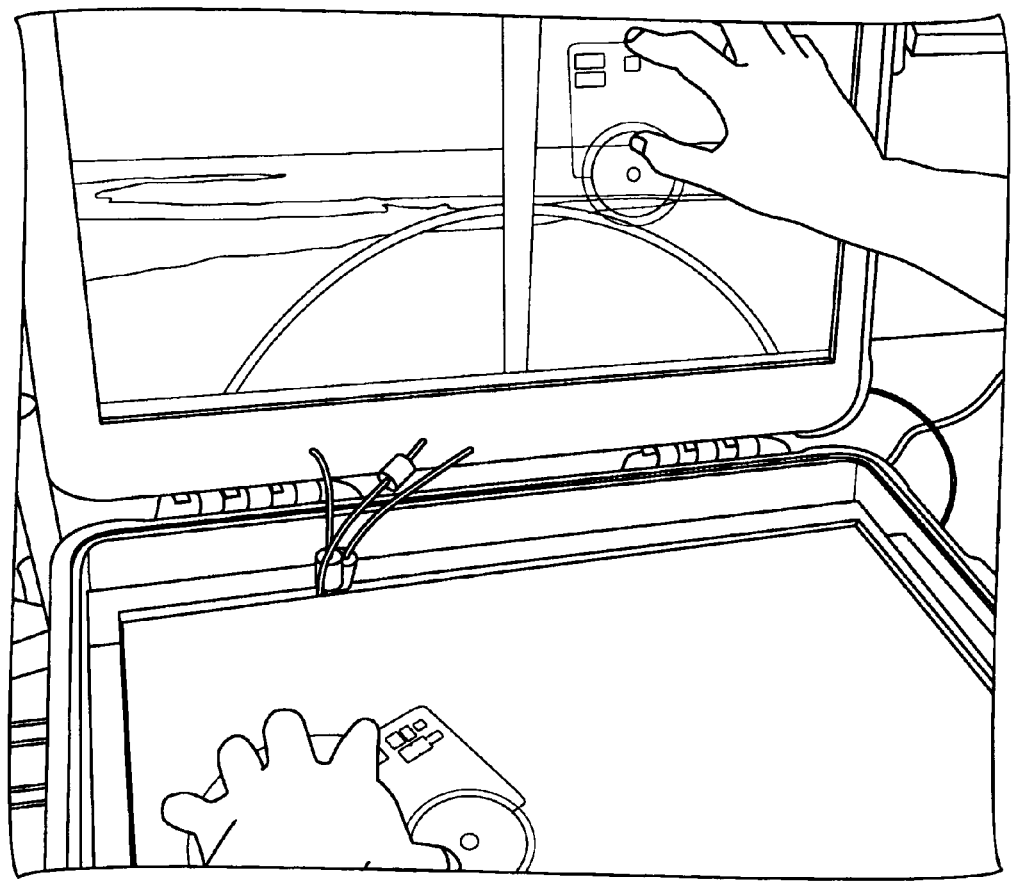
FIG. 1b shows an example of a graphical user interface implemented using multi-touch panels, according to some embodiments.

Described herein is a software-based operator control unit (SoftOCU) that can be operated using a multi-touch panel, an example of which is illustrated in FIG. 1b. A software-based operator control unit can provide a powerful replacement for conventional physical OCUs, or can be used to supplement conventional physical OCUs. Software-based operator control units can provide substantial flexibility over conventional physical OCUs due to the ease with which graphical user interfaces can be implemented and modified. Modifications, such as adding a new button or other interface feature, can be performed by altering a few lines of code. Another benefit of a software-based operator control unit is the ability to provide dynamic adaptation of the OCU for an individual user's hand size, range of motion, and hand placement. Multi-touch technologies can enable reliable single robot control or control of multiple robots in a command and control environment. In applications such as EOD and SAR, the SoftOCU can operate reliably and repeatedly, which are key attributes for applications which place the interface in a mission critical context where human lives may hang in the balance.

A difference between the standard robot-control domain and typical multi-touch applications is that operating a robot-control interface often requires the use of multiple hands and fingers simultaneously. Conventional multi-touch applications do not require an identification of which one or more hand(s) are used to operate the touch panel or an identification of which fingers of a hand are used to operate the touch panel, and therefore conventional multi-touch applications are not designed to do so. For most conventional applications, users have been observed to use a variety of different fingers or combinations of fingers for conventional multi-touch interface operations like dragging, selection, and zooming, so hand and finger identification is not needed and likely not helpful for such applications.

We found conventional algorithms for analyzing multi-touch contact points to be insufficient for hand and finger identification that would enable us to develop a suitable graphical user interface for robot control applications, such as those discussed above. Examples of some conventional multi-touch techniques will now be discussed.

Agarwal et al. applied machine learning techniques to accurately find fingertips and detect touch on regular tablet displays using an overhead stereo camera (A. Agarwal, S. Izadi, M. Chandraker, and A. Blake. High Precision Multi-touch Sensing on Surfaces Using Overhead Cameras. In *Second IEEE International Workshop on Horizontal Interactive Human-Computer Systems (Tabletop* 2007), pages 197-200, 2007). Researchers have also investigated machine learning for hand poses, which does not take fingertip detection into consideration.

Wang et al. developed an algorithm for detecting the orientation of finger pads for camera-based multi-touch devices (F. Wang, X. Cao, X. Ren, and P. Irani. Detecting and Leveraging Finger Orientation for Interaction with Direct-touch Surfaces. In *Proceedings of the 22nd Annual ACM Symposium on User Interface Software and Technology (UIST)*, pages 23-32. ACM, 2009). The orientation is derived from the angle from the contact center in the previous frame through the current frame which points away from the user's palm. Finger orientation for multiple fingers can be used to help determine if the fingers are on the same hand, but this does not necessarily indicate handedness. Additionally, people have varying flexibility to spread their fingers (e.g., a pianist or a person with arthritis), and it is difficult to robustly identify fingers based directly on contact orientation when this surface area may change dramatically while on the tips of the fingers.

Dang et al. developed an algorithm to map fingers to unique hands also based on ellipses created by fingertip contact regions (C. Dang, M. Straub, and E. André. Hand Distinction for Multi-touch Tabletop Interaction. In *Proceedings of the ACM International Conference on Interactive Tabletops and Surfaces*, pages 101-108. ACM, 2009). with the approach described in the previous paragraph, the researchers first detect the individual fingers' orientations using the major and minor axes of the ellipse and the angle of orientation of the major axis vector. A combination of heuristics allows for detection of fingers mapped to a unique hand even when not all of the fingers from a given hand are placed on the surface. The reliance on ellipses may not provide suitable results if the user uses the tips of their fingers to operate the device, which is common when a user is first learning to use a multi-touch interface.

Matejka et al. emulated a mouse on a multi-touch platform using heuristics for finger tracking. They have described a method that uses four primary methods for interaction: Chording, Side, Distance, and Gesture. They constructed a state machine that used timing for registration of the initial tracking finger or fingers. For subsequent contacts they measured the distance in pixels to identify which fingers were in contact. While their method is not computationally expensive, it makes the base assumption that the user knows to begin with the index finger before any subsequent finger contact. It also assumes that the user's hands conform to these static offsets (J. Matejka, T. Grossman, J. Lo, and G. Fitzmaurice. The Design and Evaluation of Multi-finger Mouse Emulation Techniques. In *Proceedings of the 27th International Conference on Human Factors in Computing Systems*, pages 1073-1082. ACM, 2009).

In the course of designing a robot controller, we recognized the need for a fast and highly robust algorithm for hand detection and finger registration. We have developed techniques whereby which the fingers touching the screen can be reliably and efficiently identified as digits of either a left or right hand, with each finger being registered correctly as the correct digit (e.g., thumb, index finger, etc.). We have implemented our hand and finger detection algorithms on the MICROSOFT SURFACE (diffuse infrared illumination) and 22-inch 3M MULTI-TOUCH DISPLAY M2256PW monitors (3M Projected Capacitive Touch Technology). However, the algorithms are versatile in terms of the platforms on which they can be implemented, as they can work with any suitable touch panel (e.g., touch monitors, tablet PCs, etc.) or other device.

Once this algorithm worked sufficiently well for our testing purposes, we then focused on building a robot controller that provided performance and ergonomic characteristics that met or exceeded the performance of standard physical joystick based controller systems. This application describes this design process, operation of, and the verification of the performance of the hand detection and finger registration, and an adaptive graphical user interface controller developed based on these techniques. We call the adaptive graphical user interface controller the dynamically resizing, ergonomic, and multi-touch controller: the "DREAM Controller."

The DREAM Controller provides an intuitive method for analog input with four total degrees of freedom (two on each thumb) and a wide range of other inputs via two highly customizable control panels. In some embodiments, the user interface is dynamically generated and sized for the user's hand wherever a person places his or her hand on the multi-touch screen. Since the DREAM controller can adapt to the user's hand position and orientation, tactile feedback is not required.

Design of the Graphical User Interface

One approach to user design is to borrow from outside experiences and interfaces that the user has already encountered. This design method not only helps with ease of learning, but may also exploit muscle memory that the user has developed over time while using the other interfaces. A popular controller paradigm established in the late 1990's for video games used a dual-thumb joystick design that allowed both of the thumbs to manipulate four degrees of freedom (two on each thumb) and allowed for various digital buttons and analog pressure sensitive buttons to be incorporated. FIG. 2a shows an example of a dual-thumb joystick design for a video game system. A survey of popular first-person games showed the most common way of implementing control using the two joysticks was to use the right joystick to control camera movement (e.g., viewing angle) and to use the left joystick to control character movement.

The capabilities of real robots often closely mirror those of virtual game characters: cameras affixed to the robot can look left, right, up, and down, while the robot can drive forward, backward, turn left, and turn right. As such, the dual-joystick video game control paradigm is both intuitive to people inexperienced with games and easily used by those people who had prior experience with first-person games.

Coupling the ergonomics of the hand with the familiarity of the dual-thumb joystick paradigm, we developed several paper prototypes to determine the feasibility of function and comfort for the user. Such a paper prototype is shown in FIG. 2b. A prototype implemented on a touch-screen is shown in FIG. 2c. Rather than forcing the user to use closed left and right hand positions, as in the case of a physical game controller, we decoupled the left and right hands so that the user could maintain all of the functionality of the original dual-thumb joystick design while allowing independent hand movement to any position on the screen. This independence allows for controllers for the left and right hands to be used on different areas of the screen, at different angles, and even displayed in different sizes. An unintentional, but powerful, side-effect is that the DREAM controller need not be the only functional part of the interface. As the user can choose to have both, either one, or neither of the DREAM controllers on the screen, the multi-touch panel can provide a separate interface wherever DREAM controllers are not present on the screen.

An intent of this design was to allow untrained users to quickly experiment with the touch surface and realize that the interface would conform to them reliably. Users can place five fingers of a hand on the touch panel, then the SoftOCU can do the task of re-arranging, re-sizing, and rotating the controller for the individual hand placement. As multi-touch screens are large and flat, we decided to make use of the real-estate such an input device provides in order to alleviate some of the ergonomic issues that a flattened-out video game controller could produce.

In designing the DREAM Controller, we took into account both human-computer interaction (HCI) criteria derived from Nielsen's five usability attributes (learnability, efficiency, memorability, errors, and satisfaction) and ergonomic criteria based on the anatomy of the human hand. We engineered the controller with a significant respect for the resting poses for the human arm, wrist, and hand. The paper prototypes in the early design process helped minimize flexion (decrease of angle), extension (increase of angle), and pronation (downward rotation) of the muscles in the wrists and fingers. We also considered that the movements of the thumb, index finger, and little finger have been shown to have much more individualized movement characteristics than the middle or ring fingers. In particular, the movement of the thumb for managing the two degrees of freedom for robot movement and camera positioning should be appropriate for accurate and long-term use.

Two sources of information were important in establishing the ergonomic requirements of the DREAM Controller. A wealth of ergonomic information related to gestural interfaces can be found in Nielsen, M., Störring, M., Moeslund, T. B. and Granum, E. (2004) A procedure for developing intuitive and ergonomic gesture interfaces for HCI. Int'l Gesture Workshop 2003, LNCS vol. 2915. Heidelberg: Springer-Verlag, 409-420. In this paper, the authors suggest six key principles of ergonomics: avoid outer positions, avoid repetition, relax muscles, relaxed neutral position is in the middle between outer positions, avoid staying in static position, and avoid internal and external force on joints and stopping body fluids. Each one of these principles was evaluated during the prototyping phase. Another source of anatomical information (and inspiration) was found in the 1955 book by Henry Dreyfuss titled "Designing for People." The book contains composite figures of human anatomy gathered from years of research and data collection. It was with the aid of these technical drawings that we studied the anatomy of the hand and recognized that the fingers were limited in their lateral deflection angles. Even in extreme stretching, there were key characteristics that we could exploit to identify the components of the hand. In particular, we found that the angles between fingers could be calculated and analyzed in a way that would allow identification of the fingers corresponding to each of the contact points and identification of whether the hand is a right or left hand. Examples of hand and finger registration algorithms are discussed below.

Hand and Finger Registration Algorithms

FIG. 3 illustrates a first embodiment of a hand and finger registration algorithm. First, the contact points on the multi-touch panel can be identified. Conventional multi-touch devices are able to determine the location of the contact regions and return the centroid points of each contact region, so the detection of the presence of a fingertip and identification of its location may be performed using the hardware and software provided with a conventional multi-touch device. When a finger touches the touch panel, the point of the contact can be added to a list of possible finger candidates. For example, the centroid of the contact area for a finger may be used. However, the centroid of finger contact need not be used, as any suitable point corresponding to the finger may be used, such as another point within the region of finger contact. When five or more finger candidates have been identified, the finger candidate list can be passed through a heuristic to determine if those points could contain a subset of five fingers from a single hand.

As shown in FIG. 3a, one heuristic to check whether five points can correspond to a hand is to make a pair-wise evaluation of the candidate points to determine if the points are within the maximum possible distance for a human hand. Based on Dreyfuss' measurements for the largest male hand and some empirical testing, we determined that the distances between the points typically are clustered within about eight inches. In this step, the hand and finger registration algorithm can check each point to see whether it is within eight inches of each of the other four candidate points. This heuristic was chosen because of its simplicity, and different heuristics are possible. If five of the points pass the heuristic, the points can be removed from the candidates list and added to a separate hand candidate list.

Once the heuristic above is passed, a center position of the hand can be calculated as a reference point for calculating angles between the fingertip contact points. As one example, the center position or centroid of the hand can be determined by creating a bounding box around the five points corresponding to the points of finger contact, as illustrated in FIG. 3b. The centroid of the box roughly represents a point above the center of the palm, but below the knuckle on the middle finger, and can be used as a center point for determining angles between various finger contact points. However, other techniques can be used for determining a center position of the hand, examples of which are discussed below. For example, an equation may be used that uses all or a subset of the points to create a circumscribed polygon, the center of which can be used as the center position of the hand. As another example, a circle may be fit to at least a subset of the points, and the center of a circle may be used as the center position of the hand. This technique may provide a good approximation of the location of the center of the hand, and may be orientation insensitive.

In some embodiments, the fingers can be identified based on the angles that they form with respect to one another, as illustrated in FIG. 3c. Each of the five points for the hand can be identified as corresponding to the point of contact of the thumb, index finger, middle finger, ring finger, or little finger. To make this determination, the angles between each pair of adjacent finger points can be calculated. When calculating the angles, the calculated center position of the hand can be used as the vertex. A list of five angles between adjacent finger points can be determined, and the list can be sorted by the size of the angles. Based on the anatomy of the human hand, the algorithm assumes that the largest angle in this list represents the angle between the thumb and the little finger. The second largest angle is assumed to be the angle between the thumb and the index finger. By taking the intersection of these two sets, the algorithm is able to identify the point corresponding to the thumb, as the thumb is the only point present in both of the two pairs of points subtending the largest and second largest angles. The complimentary point on the largest angle (i.e., the point separated from the thumb point by the largest angle) is then identified as the little finger and the complimentary point on the second largest angle (i.e., the point separated from the thumb by the second largest angle) is identified as the index finger. Likewise, the complimentary point to the index finger that is not the thumb is identified as the middle finger. The remaining point is identified as the ring finger.

Now that the fingers have been identified, the algorithm can determine if the fingers correspond to a right or left hand. If the angle from the thumb, centroid, and index finger is clockwise, then it is the right hand. If the angle is counterclockwise, then it is the left hand. To determine the direction of rotation, the cross product of two vectors between the index finger and the centroid and the thumb and the centroid can be calculated. For the purpose of derivation, we assign the vector from the centroid to the thumb as vector a and the vector from the centroid to the index finger as vector b. Assuming that vector a and vector b are in the XZ plane, then the cross product vector will be positive (point upwards) if the rotation from vector a to vector b is counterclockwise, and be negative (point downwards) if the rotation is clockwise. Since these are two dimensional vectors, the cross product derivation expands to expression (1) where $(x_t; y_t)$ correspond to the thumb coordinates, $(x_i; y_i)$ correspond to the index finger coordinates, and $(x_c; y_c)$ correspond to the centroid of the bounding box.

$$(x_c-x_t)\cdot(y_i-y_c)-(y_c-y_t)\cdot(x_i-x_c) \qquad (1)$$

In some embodiments, the determination of whether the hand is a right or left hand may be determined based on other fingers than the thumb and index fingers, as the techniques described herein are not limited in this respect.

Once the fingers and handedness is identified, the DREAM controller can then be displayed of the touch-sensitive surface underneath the user's hand. With the exception of the optional use of an initial bounding box to determine the centroid of the hand, it should be noted that the algorithm does not rely on a Cartesian coordinate system and is insensitive to user orientation. The algorithm can use standard arithmetic functions such as a tan 2 to calculate the angles or to perform other operations, making the algorithm quite fast and applicable for execution on limited processors in linear time. Finally, since the algorithm does not need to use any of the contact surface area information, it can be used on multi-touch technologies that only return single pixel touch points.

Figure 4:
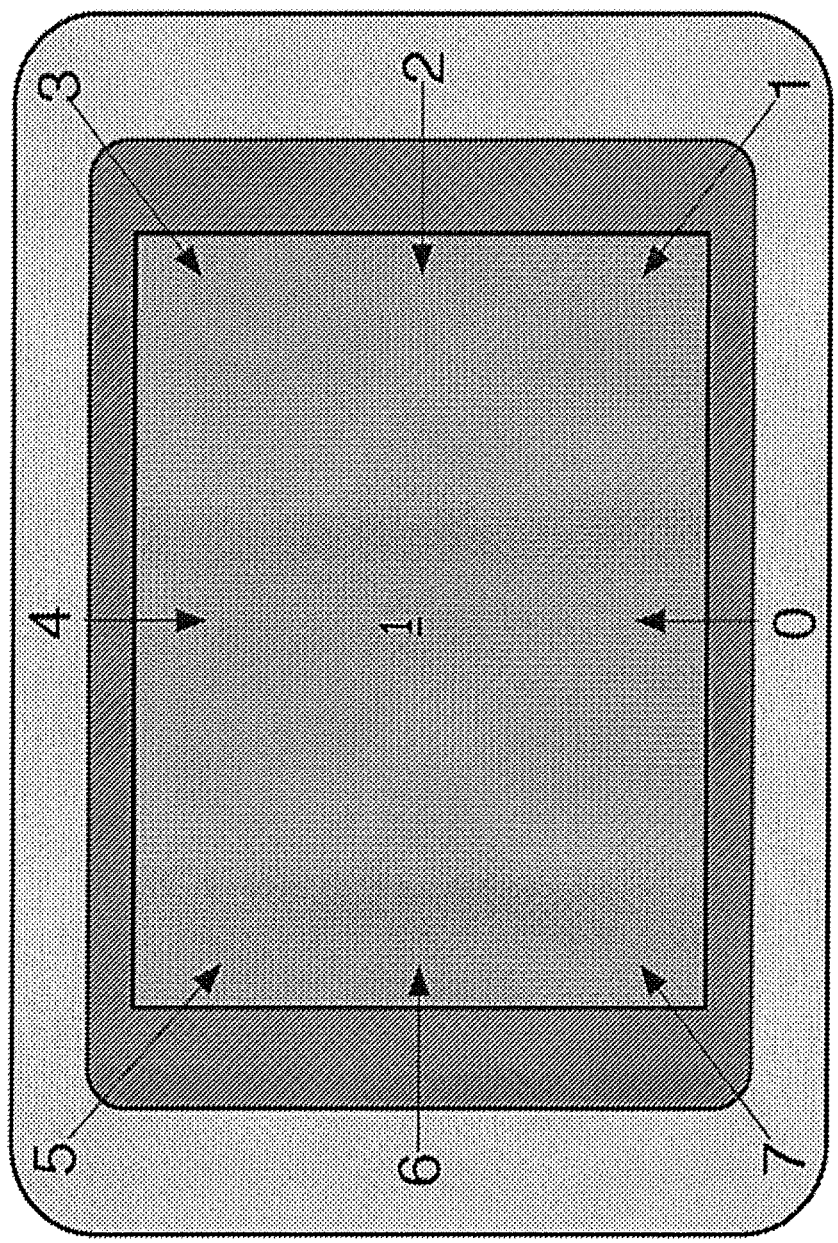
FIG. 4 shows an example of a multi-touch panel.

FIG. 4 shows an example multi-touch panel 1, which may be a multi-touch screen, and several positions 0-7 at which the user may operate the multi-touch panel 1. When testing an implementation of the first embodiment discussed above, we discovered that a disproportionate number of the incorrect identifications for the hand placements were when the user was oriented at the screen from an off-axis direction, such as positions 1, 3, 5, and 7 illustrated in FIG. 4. An analysis of our first embodiment of the algorithm (V1) revealed that when the user was along the side of the screen (positions 0, 2, 4, of 6), the bounding box around their five fingers was approximately a square, and the centroid was approximately at the center of the physical hand. However, when the user rotated his or her hand about 45 degrees (i.e., standing at a corner), the resulting bounding box was a rectangle with all sides still parallel to the screen sides, thereby causing the centroid of the bounding box to deviate from its intended location relative to the physical hand. This small deviation resulted in the angle between the index, centroid, and thumb being greater than the angle between the thumb, centroid, and little finger. The thumb was identified properly, but the fingers and the handedness were incorrectly identified as their angular relationship was skewed by the calculated centroid's not being in the center of the hand. Our improved hand detection algorithm allows the bounding box to rotate with the placement of the hand.

Figure 5A:
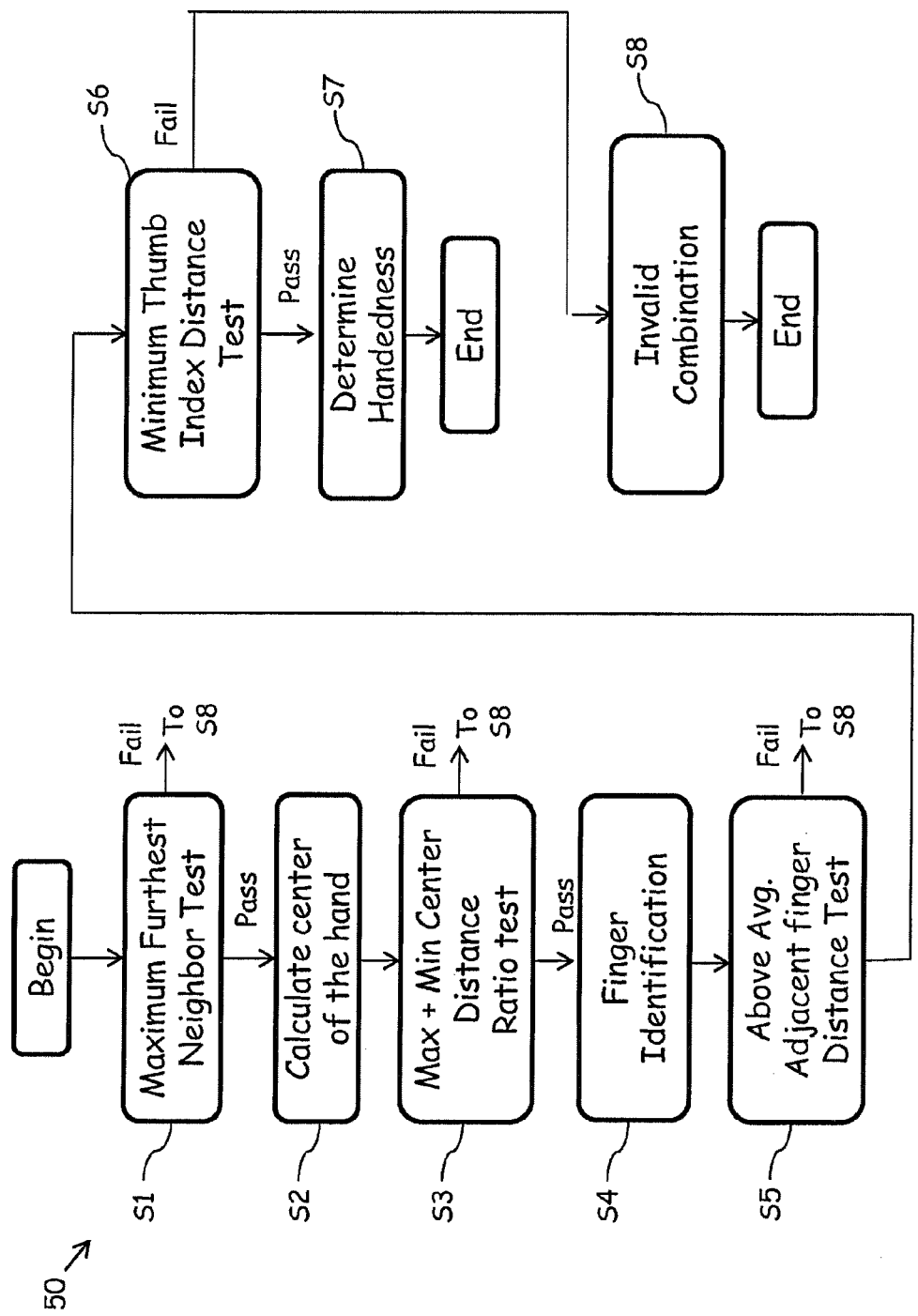

FIG. 5a illustrates a method 50 of hand and finger registration according to a second embodiment. As shown in FIG. 5a, a hand candidate test can be performed in step S1, such as the hand candidate test discussed above and illustrated in FIG. 3a, which can check that each point is within a particular distance of the other candidate points. If the test performed in step S1 fails, the combination of points may be determined to be invalid (step S8).

Figure 5B:
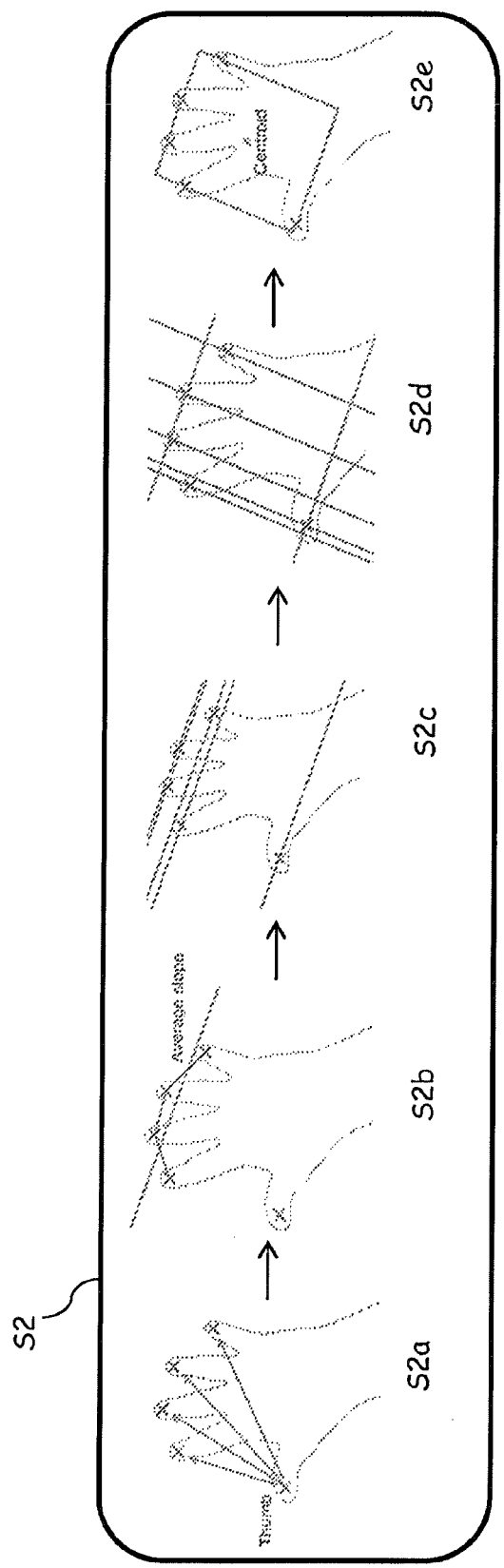

In step S2, a center of the hand can be determined. In some embodiments, a bounding box can be calculated to determine a center point for the hand that can be used to calculate angles between fingertips. As shown in FIG. 5b, the bounding box can be rotated so that two sides are parallel to and two are perpendicular to a line, such as a best-fit line, that is fit through the points corresponding to the non-thumb fingers. Two levels of distance-based sorting can be used to make an educated guess about which four points are the non-thumb fingers. In the first pass, the "thumb" can be found by finding the point that has the highest total distance from the other four points in a pair-wise comparison (step S2a in FIG. 5b). By performing the reverse of a nearest neighbor search, the algorithm can find the point that is furthest from all of the other points in the set, and identify this point as the thumb. Alternatively, a weighted average for the points in the Cartesian plane or some other heuristic may be used. After identifying the point corresponding to the thumb, the remaining four points can be ordered using a breadth-first strategy, beginning with the finger closest to the thumb.

In step S2b, the average slope of the three lines that join adjacent pairs of points can be calculated (FIG. 5b). Alternatively, the slope can be calculated by fitting a line to the four non-thumb points. If the slope is 0 or undefined, then the centroid can be found using the coordinates of the fingers themselves instead of the coordinates of the corners of the rotated bounding box (as in the first embodiment discussed above). If the slope is defined, the equation of the line parallel to the average non-thumb slope through the points corresponding to each of the fingers can be computed (step S2c of FIG. 5b). In addition, the equation of the line perpendicular to the average non-thumb slope for the each of the fingers can be calculated (step S2d of FIG. 5b). The two lines with the maximum and minimum γ-intercept from each group can be determined, as they form the sides of the bounding box around the five fingers. To find the four corners of the bounding box, all of the intersections of those four lines are calculated, and then the center position of the hand can be calculated as the center of the bounding box based on the four points that form the corners of the bounding box (step S2e of FIG. 5b).

Figure 5D:
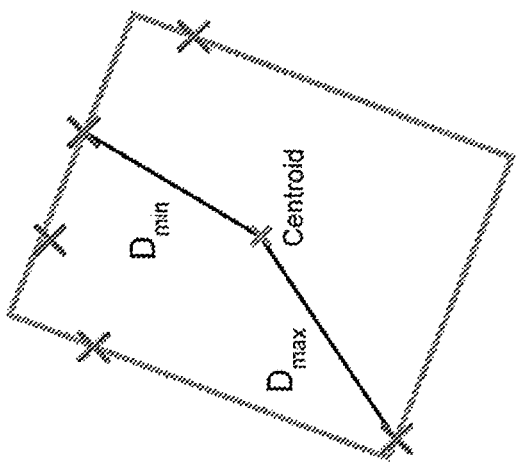
Figure 5C:
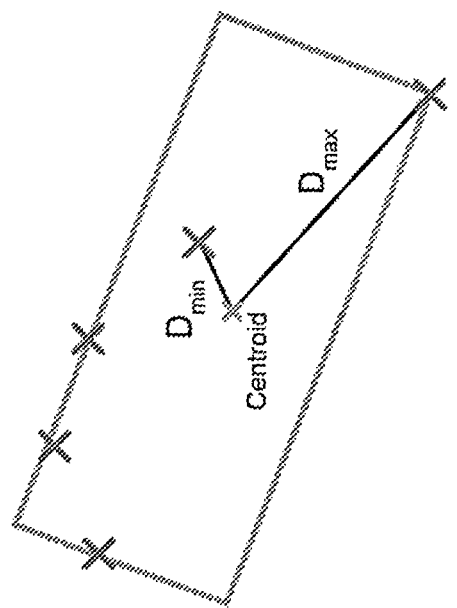

After the bounding box is determined, a test can be performed in step S3 (FIG. 5a) to check whether a finger point is located too close to the center position of the hand, to determine whether the hand candidate is invalid. To perform this test, the distance between each finger point and the centroid can be calculated. The maximum $D_{max}$ and minimum $D_{min}$ of these five distances can then be determined. The ratio of the maximum over the minimum can then be calculated. If the ratio of the maximum divided by the minimum is less than 2, then the test has passed, as no point has been determined to be unduly close to the centroid. If the ratio is greater than 2, the test fails, and the algorithm may determine that test has failed, as we found empirically that valid hand placements may have a ratio between 1 and 1.5. FIG. 5c shows an example of a point configuration that passes the above test, as $D_{max}$ and $D_{min}$ have approximately the same values. FIG. 5d shows an example of a point configuration that fails the above test, as $D_{max}$ is much greater than $D_{min}$. If the test performed in step S3 fails, the combination of points may be determined to be invalid (step S8).

The individual points can then be identified in step S4 as corresponding to specific fingers, for example, based on the angles between the fingers, as discussed above and illustrated in FIG. 3c.

Once the specific fingers are identified, two other levels of invalid hand detection may be performed on the points that correspond to the index finger and thumb. In the first validity check, performed in step S5, the average distance between each adjacent finger can be calculated (e.g., by summing the distances between each pair of fingers and dividing by five). If there are more than two inter-finger distances above that average, the combination of points may be determined to be invalid (step S8). FIG. 5e shows an example of a combination of points that passes the above test, as there are only two inter-finger distances, $D_{TT}$ and $D_{LT}$, above the average inter-finger distance. FIG. 5f shows an example of a combination of points that fails the above test, as there are three inter-finger distances, $D_{TT}$, $D_{LT}$, and $D_{RL}$ above the average inter-finger distance.

In step S6, the distance between the fingers identified as the index finger and thumb can be measured. If the distance is less than 1 inch, then the combination of points may be determined to be invalid (step S8). FIG. 5g shows an example of a combination of points that passes the above test, as the distance between the points corresponding to the thumb and index finger is greater than one inch. FIG. 5h shows an example of a combination of points that fails the above test, as the distance between the points corresponding to the thumb and index finger is less than one inch.

In step S7, the it can be determined whether the identified fingers correspond to a right hand or a left hand. For example, step S7 may be performed using the techniques discussed above and illustrated in FIG. 3d.

It should be noted that the hand validity checks performed in steps S3, S5 and S6 are optional and may be performed, if desired, to reduce the likelihood of obtaining an incorrect hand/finger identification. Other steps can be optional, as well, depending on the application. The particular thresholds discussed above for steps S1, S3, S5 and S6 are provided by way of example, and any other suitable thresholds may be used.

Graphical User Interface

In some embodiments, a graphical user interface can be displayed for the user on the touch-sensitive surface based on the position of the user's fingers and the finger identifications (e.g., see FIGS. 6-10). FIG. 6a shows a DREAM controller as example of a graphical user interface 9 that can use the hand geometry and handedness to adjust the size, orientation, and arrangement of the DREAM controller elements. As shown in FIG. 6a, there are some key measurements that can be used to determine the size, orientation and arrangement of the DREAM controller to be displayed. The following description will focus on the right hand controller. The left hand controller may be provided using a minor image of the same technique depending on the position of the user's left hand and fingers. Both right and left hand controllers may be provided on the same touch-sensitive surface when the user places both of the user's hands on the surface. Alternatively, such controllers may be provided on separate touch-sensitive surfaces, as illustrated in FIG. 1b.

Figure 6A:
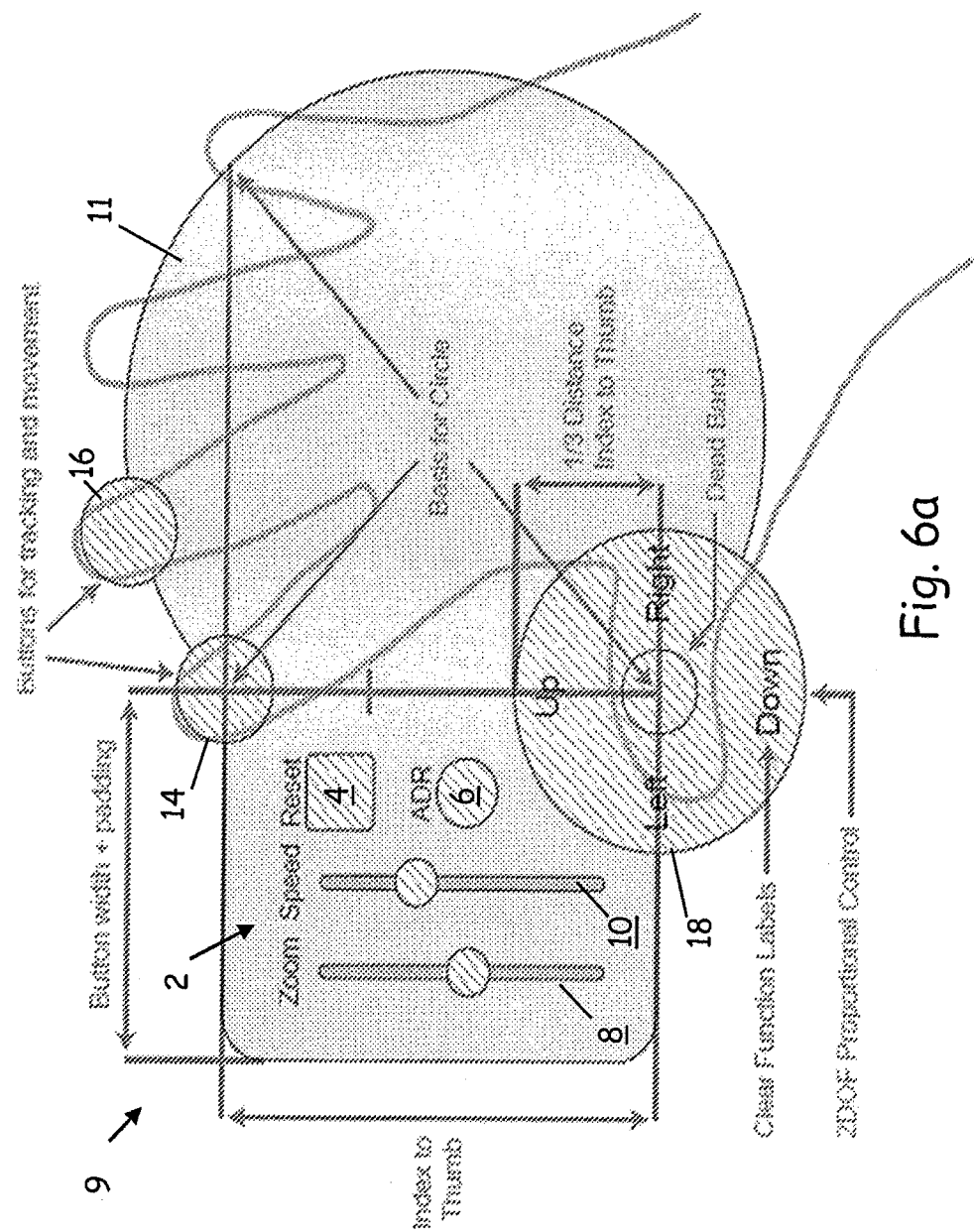
FIGS. 6a and 6b show various elements of a graphical user interface implemented using a multi touch panel, according to some embodiments.
Figure 6B:
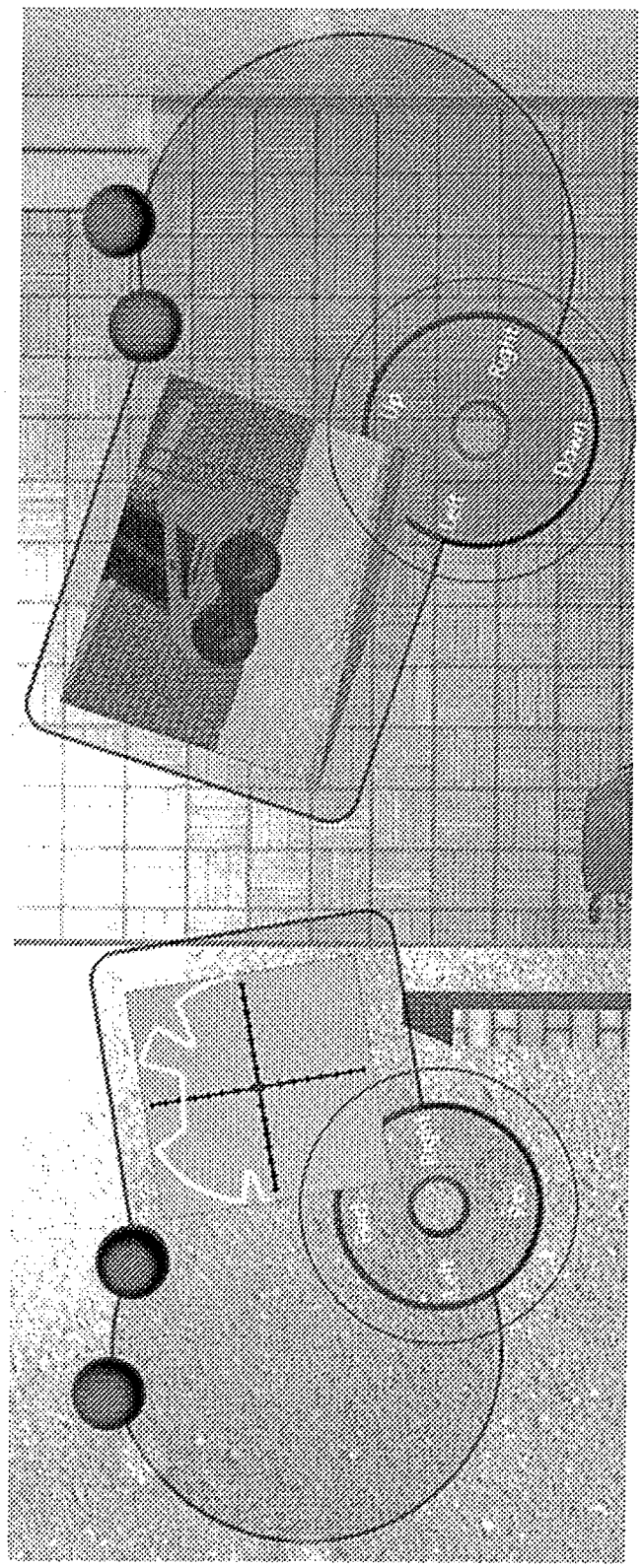

As shown in FIG. 6a, the angle from the thumb to the index finger can determine the orientation of the controller and the side panel/button grid. The top right corner of the side panel 2 can be placed at the index finger and at the lower right corner can be placed at the thumb. The width of the side panel 2 can determined by the size of the buttons 4, 6 and sliders 8, 10 with the addition of padding for layout and visual balance. The height of the side panel 2 can be set to the distance between the thumb and the index finger. Buttons 4, 6 and/or sliders 8, 10 can be displayed on the side panel 2, in some implementations. In some embodiments, other information such as images, video or data plots may be displayed in the side panel 2. For example, video from a real or virtual camera may be displayed in the side panel, as illustrated in 6b (right side). FIG. 6b (left side) shows an example in which a data plot is displayed in the side panel. The plot may show any suitable data, such as information about the environment in which a robot is located, for example.

As shown in FIG. 6a circle 11 containing the points corresponding to the thumb, index finger, and little finger can be calculated and displayed. This provides an aesthetic visual, showing the users that the controller is tailored to their specific hand size. Programmatically, this circle can be used to protect user elements in lower panels from detecting erroneous events from the finger movement on the controller layer above. Since the controller can be created and moved to any part of the screen, this can be a particularly useful feature.

The circle 11 can be calculated based on the circumcircle that surrounds the triangle created by the points representing the thumb, index, and little finger. First, the coordinates of the circumcenter is calculated using Equations (2). The distance from this circumcenter to any of the finger points is the radius of the desired circle.

$$x_c = ((y_t^2 + x_t^2)*(y_i - y_l) + (y_i^2 + x_i^2)*(y_l - y_t) + (y_l^2 + x_l^2)*(y_t - y_i))/D$$

$$y_c = ((y_t^2 + x_t^2)*(x_l - x_i) + (y_i^2 + x_i^2)*(x_t - x_l) + (y_l^2 + x_l^2)*(x_i - x_t))/D$$

$$D = 2*(x_t*(y_i - y_l) + x_i*(y_l - y_t) + x_l*(y_t - y_i)) \quad (2)$$

Two buttons 14, 16 can be displayed under the center of the index and middle fingers. These are analogous to the "shoulder" buttons used on dual-thumb joystick controllers. The buttons 14, 16 can be used as momentary or toggle buttons. In some embodiments, the buttons 14, 16 can be used as pressure sensitive buttons just like the dual-thumb joystick controllers. The relative size of the finger area detected to be in contact with the surface can be detected and used as a measure of the amount of pressure placed on the surface.

A circle pad 18 can be displayed under the thumb as a virtual joystick representing analog control for two fully proportional degrees of freedom (DOF). Much like in the dual-thumb joystick controller, the thumb can be moved up, down, left, and right depending on the desired movement or other operation desired. The circle pad 18 can have its function clearly labeled within the boundaries of the circle, as shown in FIG. 6a. The circle pad for the left hand can labeled for robot movement where the top of the circle corresponds to moving forward, bottom to moving backwards, left for counterclockwise rotation, and right for clockwise rotation. For the right hand, movement to the top of the circle pad 18 can tilt the camera up, movement to the bottom of the circle can tilt the camera down, and left and right movement rotate the camera left and right, respectively. In both hand cases, the user can have full proportional control and can fully mix the analog ranges for both degrees of freedom. The virtual joystick may visually indicate to the user the presence or absence of input and/or the direction in which the joystick is actuated. For example, the joystick may display a first color when the user's thumb is centered and may display a second color when the user's thumb is moved off-center to provide directional input. If the thumb is no longer in contact with the analog control pad, then motion of the camera pan-tilt mechanism or drive system may be halted.

The text labeling in the circle pad 18 can be useful because users may come to the interface with two different competing paradigms for camera manipulation. In the case of people familiar with first person video games, moving the thumb joystick toward the top typically causes the character view to look in an upwards direction. In the case of airplane or submarine simulators, moving the joystick down typically causes the vehicle to move toward a more upward angle. The downward motion of the joystick is commonly referred to as "pulling up" on the joystick even though in actuality the joystick is being pushed to the bottom of its freedom of movement. Interfaces can carefully implement labeling to address the potential for confusion and optionally give the user an option to select either paradigm.

The index and middle finger can be moved to adjust the angle of rotation of the controller dynamically if the thumb is not in contact with the circle pad 18. The controller can follow the user's fingers and maintain the orientation of the controller relative to the respective contact points. This freedom of movement can be stopped once the thumb makes contact with the circle pad 18. The shunting of movement can be important for safety and continuity of control, as many secondary movements can be transferred to the index and middle finger when the thumb muscles are actuated. The thumb position relative to the analog control pad changes if this movement of the index finger and middle finger then rotate or translate the position of the controller. This, in turn, causes the user to move their thumb, which causes the index and middle finger to again move. This feedback loop would quickly become very frustrating to the user and would result in the user pushing down on the screen surface to limit secondary movement. Muscle fatigue would quickly occur and the user experience would be very diminished. By simply stopping movement on thumb contact, the controller can maintain its position and allows the user to relax his or her hand muscles without consequence. At any time while using the controller, the user may lift or lower their ring and little fingers with no effect on operation. We made this design decision for the comfort of the user after noticing this relaxation behavior with the early paper prototypes. Removal of the DREAM Controller from the screen can be performed when the user lifts both their thumb and their index or middle finger.

The hand detection algorithm has a low error rate which maximizes the usability of the graphical user interface. The graphical user interface also can allow for the user to make a quick recovery from an error. If an error is made, the user can quickly realize that something has gone wrong and recover from the error. The hand and finger registration algorithm is not only fast, but is reliably insensitive to extreme finger configuration and hand orientation.

Handling of Candidate Points

Processing to start the hand and finger registration algorithm (e.g., method 50) can be initiated on a synchronous basis or an asynchronous basis. If implemented on an synchronous basis, the algorithm can be initiated in response to detecting a finger coming into contact with the screen. For example, the algorithm may be started in response to detecting that the user has placed a finger on the screen. If implemented on an asynchronous basis, the algorithm can be initiated independently of the timing at which the user places fingers in contact with the screen. For example, the algorithm can be initiated on a periodic basis whenever there are at least five finger contact points identified.

Figure 7:
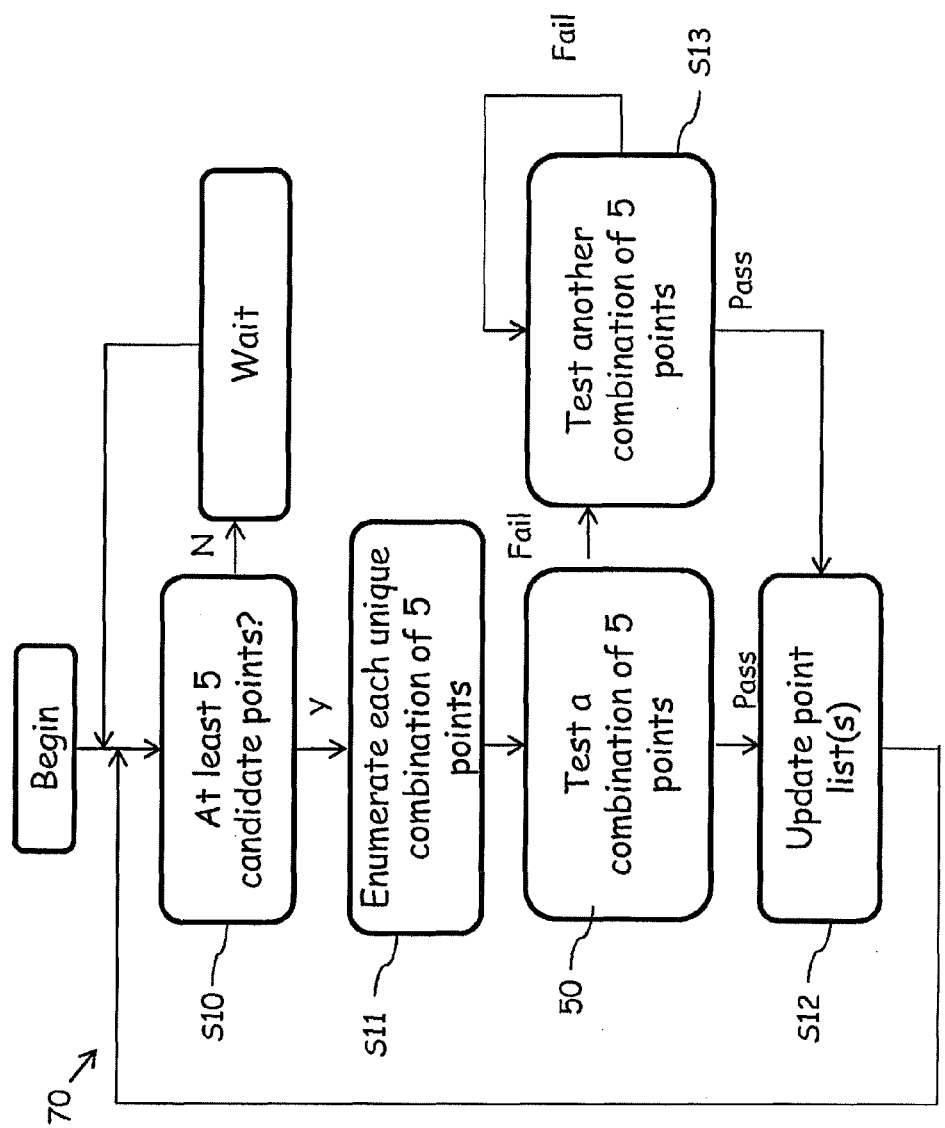
FIG. 7 shows a method of checking a list of candidate points and initiating a hand and finger registration algorithm, according to some embodiments.

FIG. 7 shows an example of a method 70 of checking a candidate list and initiating a hand and finger registration algorithm, according to some embodiments. In step S10, the list of candidate points may be checked to see if at least five finger contact points have been identified. If not, method 70 may wait for a determined period of time, and then step S10 may be re-started. If at least five candidate points are in the list, the possible combinations of five points can be enumerated in step S11. The hand and finger registration algorithm can be run on every combination of five points in the set of identified points to see if a hand can be identified. If a hand is successfully identified, the method can proceed to step S12. In step S12, the set of five points corresponding to the identified hand can be removed from the list of candidate points and added to a second list of points (e.g., a blacklist) that should be ignored because they either correspond an identified hand or are otherwise not to be considered (e.g., because they correspond to an extra contact point that in the area of an already-identified hand, such as point on the DREAM controller for the identified hand). If the test of method 50 does not result in a valid hand being identified, the method can proceed to step S13, in which another combination of five points can be checked (if available). Step S13 can be re-tried for each available set of combinations of five candidate points until no further candidates are available, in which case the method can be re-started. As a special case, if there are ten fingers in the candidate list, then a first combination of five points may only be declared as a valid hand if the remaining five points in the set of ten points are also identified as corresponding to a valid hand, in some implementations.

Advantageously, such an implementation can allow the user to place both hands on the screen at the same time or at arbitrary times and can correctly identify the points of each hand. The algorithm can test the available points on a continuous basis until a hand is identified.

Each point may be represented as a data object having an identifier and a position value. To reduce the time it takes to enumerate the combinations of five fingers when there are five or more candidates in the list, memorization can be employed so the bulk of the work this enumeration entails is performed only once for all collections of a certain size. For example, all of the possible permutations of sets of five candidate points within groups of six points, seven points, n points, etc., can be calculated in advance so that this computational work does not need to be performed on the fly as the user is operating the device. Each identifier for a contact point can be mapped to an integer from 0 to n−1, where n is the number of available candidate points. When a list of contact points changes, the enumeration of the various combinations of five points can be performed by looking up the previously-performed enumeration based on the number of points, and substituting the identifier of the point for the index value.

In some cases, initiating the hand and finger registration algorithm synchronously may result in nondeterministic behavior if the testing of the candidate points is done when fingers come in contact with the screen, or may cause excessive computational load on the system if it is done when fingers either came into contact with the screen or are moved on the screen.

Initiating the hand and finger registration algorithm by periodically making a working copy of a well-maintained candidate list, testing it, and verifying that changes since computation began have not invalidated the set (i.e., making sure fingers determined as part of a left/right hand have not left the screen, etc.) can allow individual events to be processed in constant time, without having to wait for computations to yield a determination of whether that specific event resulted in a hand being detected.

All touches that do not occur on top of a DREAM controller may be handled separately, allowing for a dually functional, rich interface. As soon as five fingers are detected as a hand, five "up" events may be raised, so the system interaction can respond as though the fingers were lifted from the screen. A DREAM controller is then created according to those five fingers, their determined handedness and registrations. A significant aspect of allowing this dually functional event system is providing mutual exclusion between events on a DREAM controller, and those in the remainder of the interface. Any action on the interface that can be handled by the remainder of the interface is also one that would result in a candidate list management action, such as adding a candidate on a down event, updating a candidate's position when it moves, or removing a candidate when it leaves the screen. Due to the asynchronicity of the hand detection, the fifth finger to come down can register as a down event in the interface, quickly followed by an up event, when the finger is used to create a DREAM controller.

The following are examples of actions that can be performed for maintaining the candidate list and blacklist when events occur.

Down event
  On controller
    Add to blacklist
  Off controller
    Add to candidate list
Change of position event
  From on controller to on controller
    Update contact in blacklist
  From off controller to off controller
    Update contact in candidate list
  From off controller to on controller
    Remove from candidate list, and add to blacklist
  From on controller to off controller
    Leave in blacklist (forces user to intentionally place their finger down on the screen to keep accidental input moved off of the controller from registering as candidates)
Up Event
  On controller
    Remove from blacklist, and make movable if index/middle/thumb . . . if 2 of the index/middle/thumb circles are not occupied by a touch, remove the displayed controller
  Off controller
    Remove from candidate list Experimental Results To test the hand detection and the finger registration algorithm, we designed an experiment to collect data from a wide sampling of people to get a range of hand sizes and natural angles between fingers. For this experiment, we used a MICROSOFT SURFACE which uses diffuse illumination of infrared (IR) light.

At the start of the experiment, the participant would stand facing the surface. Participants were asked to stand in one of eight positions: four corresponding to the sides of the surface and four to the corners of the surface, as shown in FIG. 4. A participant would stay in his or her location for the entire data collection session.

Once positioned, the participant was asked to place his or her fingers down on the table in three configurations, first with the right hand, then with the left. Each hand posture was demonstrated by the researcher for the participant and is shown in FIG. 7.

First, participants were asked to curl their fingers so that the tips touched the board simultaneously, similar to a pose used by piano players or touch typists. After the SURFACE registered the touches, our algorithm would run, displaying how it identified the fingers and hand. Participants were then asked to remove their hand from the surface. If the supplied vision processing system failed to identify all five touches when a participant put his or her hand down (sources of the interference could be sunlight, fluorescent lighting, or other sources of IR light) the participant would be asked to try the hand position again.

Second, participants were asked to relax their hand so that their muscles were in a neutral position and pose. In the ergonomic literature, this hand position would be referred to as a position of function. This position is the same pose that is used after a hand injury when a hand is placed in a cast. It is the most natural and ergonomic pose for the human hand. Participants were again asked to place the pads of their fingers on the SURFACE simultaneously. After the SURFACE registered the five points and our algorithm ran, participants were told they could remove their hand from the table. If the SURFACE did not register all five points, the participant was asked to put his or her hand down in that position again.

Third, participants were asked to stretch their fingertips as far as they could while maintaining reasonable comfort. This position represents the maximum hand size that the participant can create. Again, participants were asked to place the pads of their fingers on the surface simultaneously.

Data was collected in three ways. First, the test administrator wrote down on paper whether the algorithm correctly identified the hand and fingers. Correctness was determined by visually inspecting the labels over the fingers. Because the algorithm could not measure its own performance, this manual step was also used for evaluation.

Data was also collected using the Surface Simulator Recording Utility. This utility creates a script file for all of the touch events on the Surface. A script was created for each user individually. A concatenation of these scripts provides a comprehensive way to test future versions of the algorithm and compare them directly to this study.

Finally, each time the hand detection and finger registration was executed, a photograph of the raw image of the diffused illumination surface was taken. This image capture used the same cameras in the surface that provide all of the image processing of touch points. This final data collection step was done in the event that a future hand detection or registration algorithm is developed that wishes to bypass the standard SURFACE API libraries and process the images directly. Since the SURFACE cameras can see fingers and hands slightly above the surface of the screen, information outside of touch contacts may be an interesting source for future information gain about the orientation and registration of fingers. In the interest of direct comparison, this photographic data set could be used to evaluate a new algorithm relative to algorithms that strictly use the script method above.

Sixty-five people participated in this experiment (21 female, 44 male), which resulted in a data set of 390 hand placements on the SURFACE. We used the MICROSOFT SURFACE SIMULATOR to record Surface Contact Scripts, which are key frame animation-like XML files that allow every touch that occurred on the screen to be played back in real time. Due to recording issues, the data set only contains the contact scripts for 62 participants.

The user may or may not place his or her hand in a comfortable or correct posture for efficient use of the DREAM Controller. While it is hoped that this will eventually be the case, during the experimentation and learning phase, the user may present many different hand configurations. The algorithm should determine the correct finger registrations and arrange the controller correctly in even severely sub-optimal hand positions. If not, the user will doubt that the interface will perform reliably.

Figure 8:
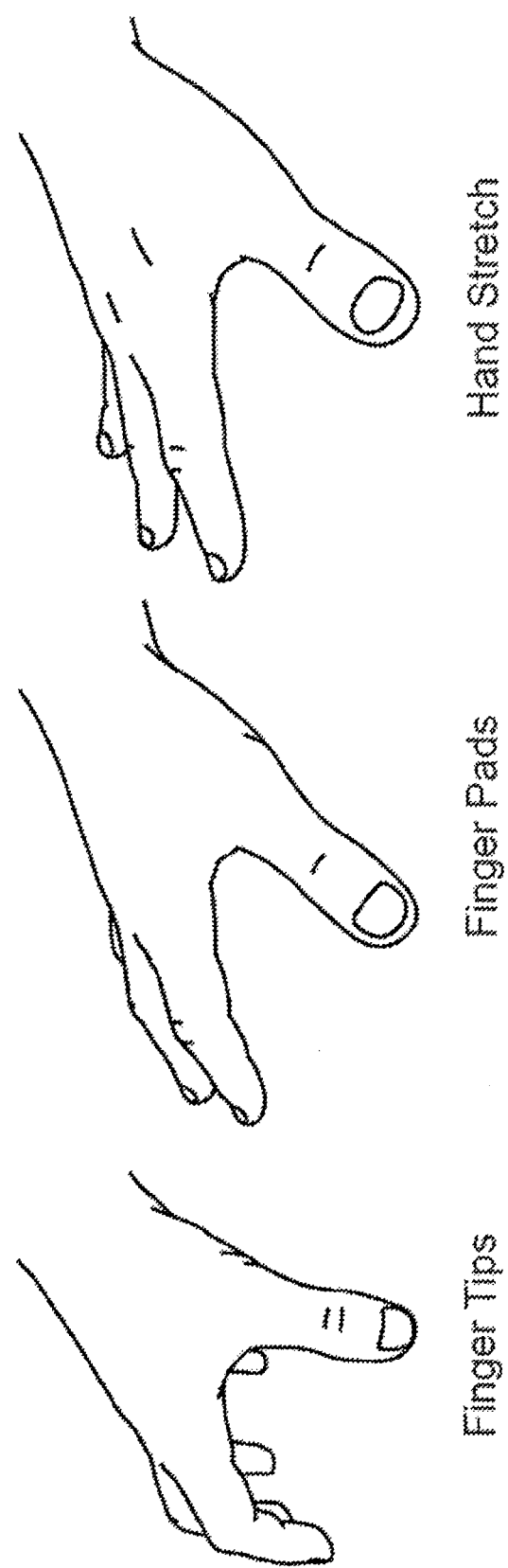
FIG. 8 shows examples of three hand positions that may be used to operate a touch panel.

The three hand postures shown in FIG. 8 represent two extreme cases and one desired case. When the participant touched the SURFACE with the tips of their fingers, this represents a very compact and minimal size for the overall surface area of the fingers and will result in the smallest controller size. This position is also an expected experimentation approach for any users who are familiar with touch typing. The anatomy of the hand in this configuration (as detected by the surface) is not as well defined since the fingers are arched and do not have their normal representative angles of deflection. From the view of the surface, the points are shortened fingers relative to the centroid of the bounding box and would therefore have potentially different angle characteristics.

In the second case, the relaxed pose puts the hand in the most ergonomic position and maximizes the surface area of the finger pads. The anatomy of the hand in this configuration is closest to the position of function and represents a detectable configuration for the algorithm. This position is the one that we hope most users would use after some experience with the system. This posture should minimize fatigue and give the highest degree of manipulation for the thumb joystick.

The final posture represents the maximum size that the participant can generate with their hand. Since the thumb is fully extended in this case, it would not be a usable configuration for control of the thumb pad. This said, one would expect an inexperienced user to test this hand configuration during their learning time to see how the system responds. This position also presented an opportunity to see if the hand detection heuristic for a cluster of points within 8 inches was appropriate for the population tested.

We conducted 1-tailed paired t-tests with $\alpha=0.05$ examining the three different hand postures. Table 1 shows the recognition rate for the right, left, and combined hand placements. We found that the first embodiment of the algorithm (V1) recognized the participants' hands significantly better when people used the pads of their finger versus the tips of their fingers overall ($p<0.03$, 0265)=2.20).

TABLE 1

|  | Tips | Pads | Stretch |
| --- | --- | --- | --- |
| Right Hand | 56 of 65 (86.15%) | 61 of 65 (93.85%) | 62 of 65 (95.38%) |
| Left Hand | 59 of 65 (90.77%) | 60 of 65 (92.31%) | 62 of 65 (95.38%) |
| Both | 115 of 130 (88.46%) | 121 of 130 (93.08%) | 124 of 130 (95.38%) |

The algorithm also recognized the participants' hands significantly better when people had their hands fully stretched versus the tips of their fingers overall ($p<0.01$, 0265)=2.99). Further, in comparing the tips and stretched hand positions, we found that the algorithm performed significantly better in both in right hand placements ($p<0.02$, $t(129)=2.43$) and in left hand placements ($p<0.05$, $t(129)=2.06$). The third hand posture in which the participant was asked to stretch his/her hand to maximally comfortable position is another instance of the pads hand posture. As such, we found no statistical significance between the recognition rates between the pads and stretch hand postures.

One of the inherent values of some types of multi-touch devices is the ability to bring people around a common table. Unlike traditional WIMP (windows, icons, menus, and pointer) interfaces which have a clear sense of orientation, people may use the multi-touch device from any side. In this experiment, participants stood at one of eight positions.

We examined the recognition rate for the hand placements for which the participant was perpendicular to a major axis (i.e., positions 0, 2, 4, and 6) versus those who were at a 45 degree angle between the major axes (i.e., positions 1, 3, 5, and 7). For participants facing a major axis, the algorithm recognized 99.46% (185 of 186) of the hand placements and 85.78% (175 of 204) of the hand placements for participants who were not. We conducted 1-tailed unpaired t-test with α=0.05 and found that our algorithm performed significantly better with on-axis hand placements (p<0.01, t(388)=5.51).

Table 2 shows the hand and finger algorithm recognition rates for males, females, and all participants combined, using the first embodiment of the hand and finger registration algorithm (V1). We conducted 1-tailed unpaired t-test with α=0.05 and found that our algorithm performed significantly better overall on hand placements from male participants versus female participants (p<0.01, t(388)=2.79).

TABLE 2

|  | Overall | Tips | Pads | Stretch |
|---|---|---|---|---|
| Male | 251 of 264 (95.08%) | 81 of 88 (92.05%) | 84 of 88 (95.45%) | 86 of 88 (97.73%) |
| Female | 109 of 126 (86.51%) | 34 of 42 (80.95%) | 37 of 42 (88.10%) | 38 of 42 (90.47%) |

Figure 9:
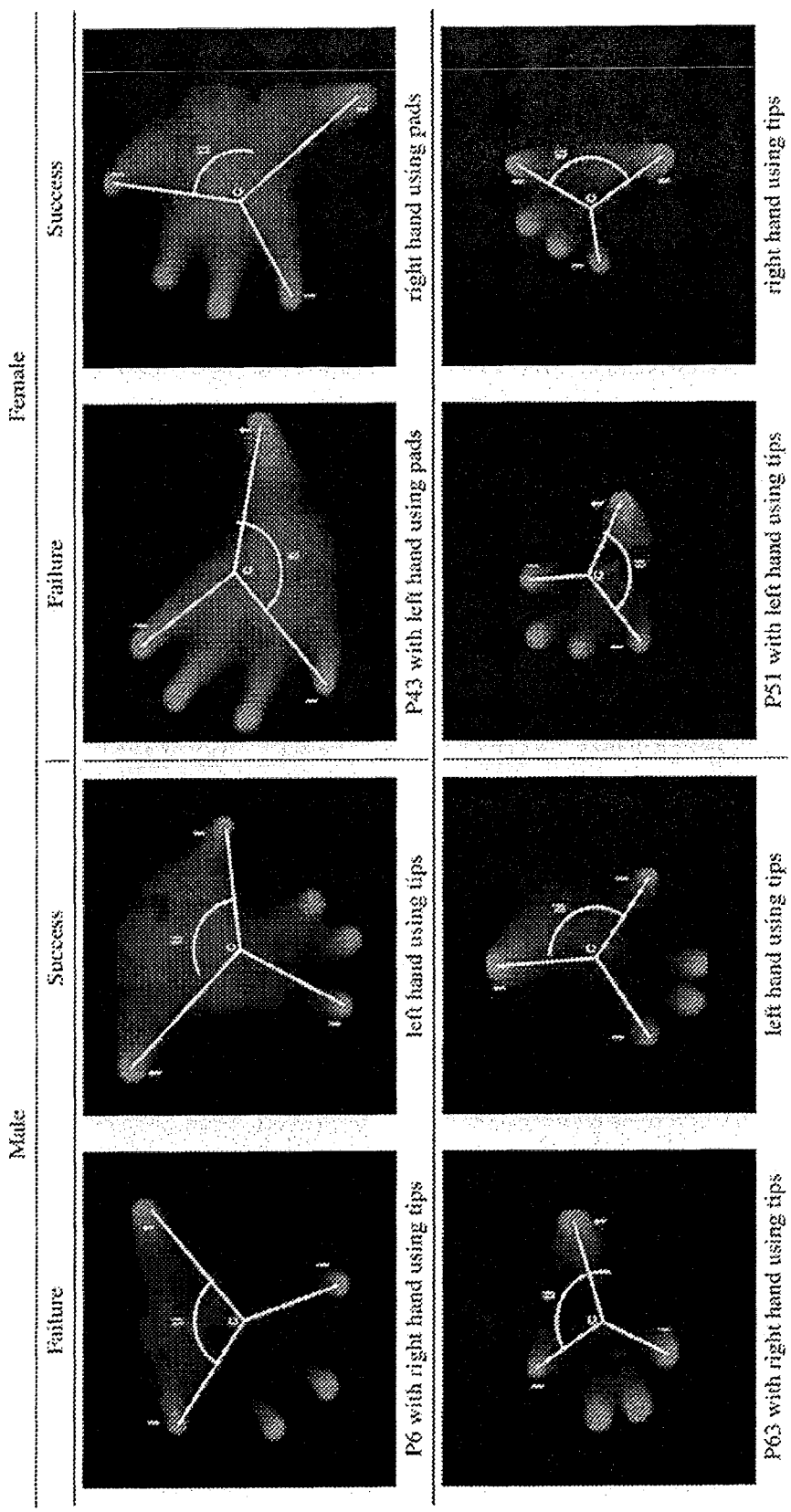
FIG. 9 shows experimental results of a hand and finger registration algorithm.

Interestingly, we find that in 97% (28 of 29) of the failed recognitions of hand placements for both male and female have to do with placement of the thumb relative to the fingers. FIG. 9 shows a sampling of the failure cases in which the angle between the thumb and index finger is greater than the angle between the thumb and little finger. Visually, the thumb might seem to be nearly equal in distance to both the index and little fingers. Physically, the thumb is positioned under the palm. At this point, it is unclear if this is also a function of the difference in hand size between men and women, of an effect that would reduce with a larger population. Regardless, we believe that the user's hand would quickly tire in this position while manipulating the proportional joystick because of the restricted thumb movement. We hope that when actually using the DREAM controller, the user would adjust his or her hand to a more comfortable and less tiring configuration.

We tested both algorithms with the 62 Surface Contact Scripts including erroneous input to see how accurate they were at identifying hands (Table 3). We first manually coded the 62 Surface Contact Scripts to determine at what time each hand detection in our original manual logs occurred and noted the handedness of any touch combinations that appeared to be a valid hand placement. The raw data set contains 405 hand placements. We ran the raw data set through the first and second embodiments of the hand and finger detection algorithms discussed above. Each detected hand was logged with the playback time at which the detection had occurred. The two logs were then compared with the human-determined identifications of that very same data. "Correct" is defined as the algorithm returning the same handedness as was manually coded within the same second of playback as the manually coded hand.

Table 3 shows the percentage of correctly identified hand placements (# correct/total placements). The first embodiment (V1) hand detection algorithm correctly detected 91.60% (371 of 405) of the hands for those 62 users' contact scripts, and the second embodiment (V3) correctly detected 97.04% (393 of 405) of the hands.

TABLE 3

|  |  | Position 0 | Position 1 | Position 2 | Position 3 | Position 4 | Position 5 | Position 6 | Position 7 |
|---|---|---|---|---|---|---|---|---|---|
| Overall | V1 | 65 of 65 (100%) | 42 of 52 (80.8%) | 51 of 51 (100%) | 49 of 52 (94.2%) | 47 of 49 (95.9%) | 33 of 39 (84.6%) | 41 of 44 (93.2%) | 43 of 53 (81.1%) |
|  | V2 | 64 of 65 (98.5%) | 49 of 52 (94.2%) | 50 of 51 (98%) | 52 of 52 (100%) | 47 of 49 (95.9%) | 37 of 39 (94.9%) | 43 of 44 (97.7%) | 51 of 53 (92.2%) |
| Right overall | V1 | 35 of 35 (100%) | 21 of 25 (84%) | 27 of 27 (100%) | 26 of 27 (96.3%) | 22 of 23 (95.7%) | 14 of 19 (73.7%) | 22 of 23 (95.7%) | 24 of 29 (82.8%) |
|  | V2 | 35 of 35 (100%) | 24 of 25 (96%) | 27 of 27 (100%) | 27 of 27 (100%) | 22 of 23 (95.7%) | 18 of 19 (94.7%) | 22 of 23 (95.7%) | 27 of 29 (93.1%) |
| Right tips | V1 | 13 of 13 (100%) | 6 of 8 (75%) | 9 of 9 (100%) | 7 of 7 (100%) | 7 of 8 (87.5%) | 4 of 6 (66.7%) | 7 of 7 (100%) | 7 of 10 (70%) |
|  | V2 | 13 of 13 (100%) | 7 of 8 (87.5%) | 9 of 9 (100%) | 7 of 7 (100%) | 7 of 8 (87.5%) | 5 of 6 (83.3%) | 7 of 7 (100%) | 8 of 10 (80%) |
| Right pads | V1 | 12 of 12 (100%) | 7 of 8 (87.5%) | 9 of 9 (100%) | 8 of 9 (88.9%) | 7 of 7 (100%) | 5 of 6 (83.3%) | 7 of 7 (100%) | 6 of 8 (75%) |
|  | V2 | 12 of 12 (100%) | 8 of 8 (100%) | 9 of 9 (100%) | 9 of 9 (100%) | 7 of 7 (100%) | 6 of 6 (100%) | 7 of 7 (100%) | 8 of 8 (100%) |
| Right stretch | V1 | 10 of 10 (100%) | 8 of 9 (88.9%) | 9 of 9 (100%) | 11 of 11 (100%) | 8 of 8 (100%) | 5 of 7 (71.4%) | 8 of 9 (88.9%) | 11 of 11 (100%) |
|  | V2 | 10 of 10 (100%) | 9 of 9 (100%) | 9 of 9 (100%) | 11 of 11 (100%) | 8 of 8 (100%) | 7 of 7 (100%) | 8 of 9 (88.9%) | 11 of 11 (100%) |
| Left overall | V1 | 30 of 30 (100%) | 21 of 25 (84%) | 24 of 24 (100%) | 23 of 25 (92%) | 25 of 26 (96.2%) | 19 of 20 (95%) | 19 of 21 (90.5%) | 19 of 24 (79.2%) |
|  | V2 | 29 of 30 (96.7%) | 25 of 25 (100%) | 23 of 24 (95.8%) | 25 of 25 (100%) | 25 of 26 (96.2%) | 19 of 20 (95%) | 21 of 21 (100%) | 24 of 24 (100%) |
| Left tips | V1 | 10 of 10 (100%) | 6 of 8 (75%) | 8 of 8 (100%) | 7 of 9 (77.8%) | 8 of 8 (100%) | 6 of 6 (100%) | 5 of 7 (71.4%) | 5 of 8 (62.5%) |
|  | V2 | 10 of 10 (100%) | 7 of 8 (87.5%) | 7 of 8 (87.5%) | 9 of 9 (100%) | 8 of 8 (100%) | 6 of 6 (100%) | 7 of 7 (100%) | 8 of 8 (100%) |

TABLE 3-continued

|  |  | Position 0 | Position 1 | Position 2 | Position 3 | Position 4 | Position 5 | Position 6 | Position 7 |
|---|---|---|---|---|---|---|---|---|---|
| Left pads | V1 | 10 of 10 (100%) | 6 of 8 (84%) | 8 of 8 (100%) | 7 of 7 (100%) | 8 of 9 (88.9%) | 6 of 6 (100%) | 7 of 7 (100%) | 7 of 8 (87.5%) |
|  | V2 | 10 of 10 (100%) | 8 of 8 (100%) | 8 of 8 (100%) | 7 of 7 (100%) | 8 of 9 (88.9%) | 6 of 6 (100%) | 7 of 7 (100%) | 8 of 8 (100%) |
| Left stretch | V1 | 10 of 10 (100%) | 9 of 11 (81.8%) | 8 of 8 (100%) | 9 of 9 (100%) | 9 of 9 (100%) | 7 of 8 (87.5%) | 7 of 7 (100%) | 7 of 8 (87.5%) |
|  | V2 | 9 of 10 (90%) | 10 of 11 (90.9%) | 8 of 8 (100%) | 9 of 9 (100%) | 9 of 9 (100%) | 7 of 8 (87.5%) | 7 of 7 (100%) | 8 of 8 (100%) |

The hand and finger identification and registration algorithm described above has successfully been used to control real and simulated robots with DREAM Controllers. In a user study of a search and rescue task with first responders (n=6), we observed people who had never interacted with a multi-touch device or a video game controlling an ATRV-JRs movement and the robot's cameras' pan tilt without looking at their hands during their 25 minute runs. In a multi-robot command and control interface, the DREAM controller provided a means of taking control of one of multiple simulated robots.

We are currently allowing the detection of hands when there are more than 5 touches on the screen. With its current 97% accuracy rate, the algorithm has shown itself to be effective for controlling robots using the DREAM Controller.

Other Applications

Although the above embodiments have been described in the context of controlling physically situated robots, the controller and finger/hand registration algorithms can be used effectively for video game play and other domains when multiple degrees of freedom are managed simultaneously. First person video games are one application, but others such as crane or forklift operation, manufacturing equipment, or aircraft control may benefit from controllers like the one described. Other applications include software drawing programs and photo manipulation software. The techniques described herein can be used for many different applications, and are not limited to those described herein.

Figure 10B:
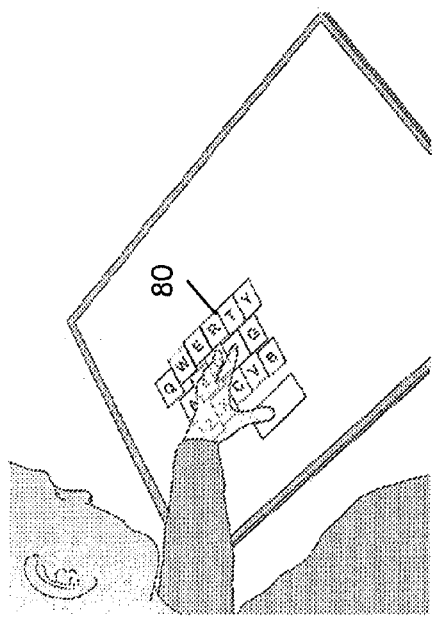
FIGS. 10a-10d show an example of displaying a virtual keyboard as a graphical user interface.
Figure 10D:
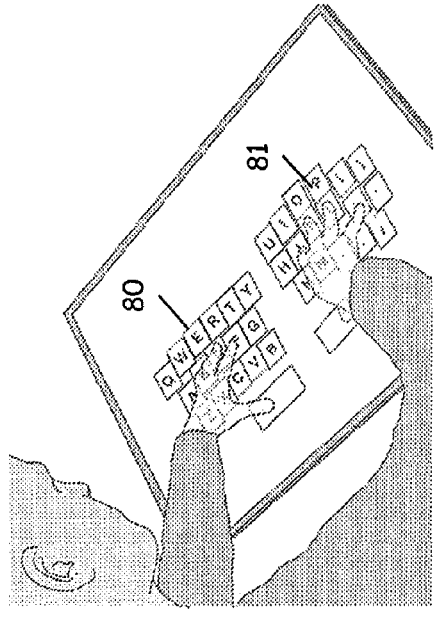
Figure 10A:
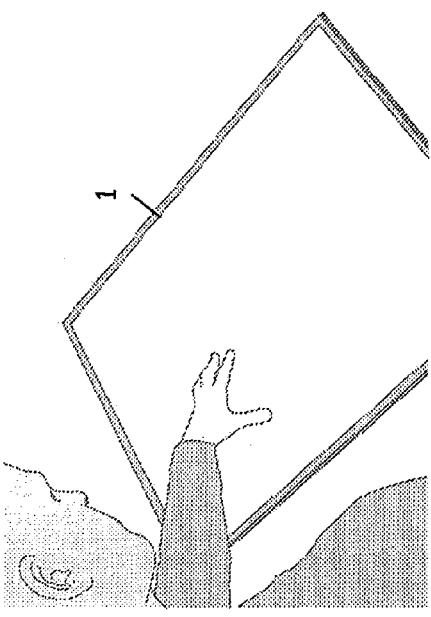
Figure 10C:
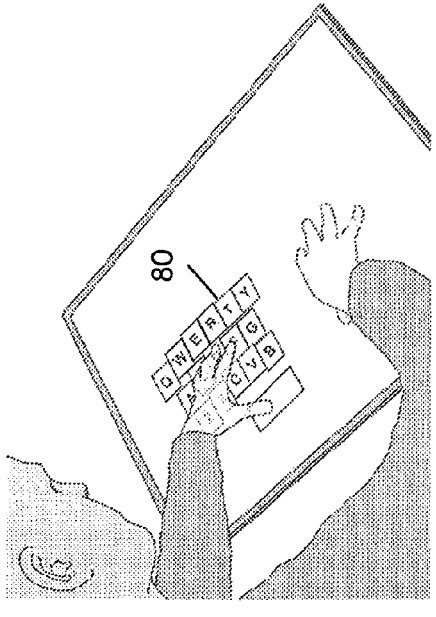

In some embodiments, the techniques described herein may be used to identify fingers to display a virtual keyboard under the user's hands. For example, as illustrated in FIG. 10a, when a user places their left hand on a touch screen, a hand and finger registration algorithm, such as method 50, may be initiated to identify the fingers of the user's hands, and the hand to which the fingers correspond. As shown in FIG. 10b, a first portion 80 of a virtual keyboard can then be displayed based on the positions of the user's fingers. For example, a QWERTY keyboard with virtual keys can be displayed under the fingers of the user's left hand such that a key with the letter "A" appears under the little finger on the left hand, a key with the letter "S" appears under the ring finger on the left hand, a key with the letter "D" appears under the user's left middle finger, a key with the letter "F" appears under the left index finger, and the space bar appears under the thumb(s). As illustrated in FIG. 10c, when the user places their right hand on a touch screen, a hand and finger registration algorithm, such as method 50, may be initiated to identify the fingers of the user's right hand. As shown in FIG. 10d, a second portion 81 of a virtual keyboard can then be displayed based on the positions the fingers of the right hand. For example, a key with the letter "J" may be displayed under the right index finger, a key with the letter "K" may be displayed under the right middle finger, a key with the letter "L" may be displayed under the right ring finger, and the semicolon/colon key may be displayed under the little finger of the right hand.

If a QWERTY-style keyboard is used, the remaining keys of the QWERTY keyboard may also be displayed. As with the DREAM controller discussed above, the interfaces for the right and left hands may be decoupled from one another such that the left half of the keyboard is displayed at a position and orientation that depends on the position of the user's left hand, and the right half of the keyboard is displayed at a position and orientation that depends on the position and orientation of the user's right hand. As the user types by tapping various keys using typical typing motions, the position of the keyboard may remain stationary. However, if more than one finger of a hand is lifted (e.g., a particular combination of fingers), the displayed virtual keyboard may rotate and/or move to adapt to the position and/or orientation of the user's hand. The user may thereby type on the touch screen in an ergonomic manner using a virtual keyboard that can conform to the shape, position and orientation of the user's hands. Various options are possible for displaying the virtual keyboard. For example, the keys may be displayed with or without their corresponding letters/symbols. Optionally, an indication may be displayed for the user to show that a particular key has been pressed. If desired, word prediction software can be used to correct typing errors by predicting the word that the user is likely to be typing.

Additional Aspects

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

For example, embodiments of controllers implementing the hand/finger registration algorithm and/or DREAM controller may be implemented using hardware, software or a combination thereof. When implemented in software, the software code can be executed on any suitable hardware processor or collection of hardware processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed to perform the functions recited above.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A method of identifying one or more fingers of a hand, the method comprising:
    calculating a center position of the hand based at least on points corresponding to a plurality of the fingers;
    calculating angles between the points based at least on positions of the points and the center position of the hand; and
    identifying, based on the angles, which one or more fingers of the hand correspond to one or more of the points,
    wherein the center position is calculated by determining a center of a bounding box around the points.

2. The method of claim 1, further comprising:
    receiving the points, wherein the points represent locations of contact between the fingers and a surface.

3. The method of claim 1, further comprising:
    calculating a slope corresponding to non-thumb points of the hand, wherein the bounding box is determined based on the slope and the positions of the points.

4. A method of identifying one or more fingers of a hand, the method comprising:
    calculating a center position of the hand based at least on points corresponding to a plurality of the fingers;
    calculating angles between the points based at least on positions of the points and the center position of the hand;
    identifying, based on the angles, which one or more fingers of the hand correspond to one or more of the points;
    determining a largest angle between any two nearest points; and
    determining a second largest angle between any two nearest points,
    wherein the step of identifying comprises identifying a first point at an intersection of the largest and second largest angles as corresponding to a thumb.

5. The method of claim 4, wherein the center position is calculated by determining a center of a bounding box around the points.

6. The method of claim 4, wherein the center position is calculated by determining an average or weighted average of the points.

7. The method of claim 4, wherein the step of identifying further comprises identifying a second point separated from the first point by the largest angle as corresponding to a little finger.

8. The method of claim 7, wherein the step of identifying further comprises identifying a third point separated from the first point by the second largest angle as corresponding to an index finger.

9. The method of claim 8, wherein the step of identifying further comprises identifying a fourth point nearest the third point as corresponding to a middle finger.

10. The method of claim 8, wherein the step of identifying further comprises identifying a fifth point nearest the second point as corresponding to a ring finger.

11. The method of claim 1, wherein the method is initiated on a repeated basis with a timing independent of times at which the fingers are detected.

12. A method of determining whether fingers correspond to a right hand or a left hand, the method comprising:
    determining a first vector along a first direction between a first point, corresponding to a first finger, and a second point corresponding to a center of a hand;
    determining a second vector along a second direction between a third point, corresponding to a second finger, and the second point;
    calculating a cross product between the first and second vectors; and
    determining whether the fingers correspond to a right hand or a left hand based on the cross product.

13. The method of claim 12, wherein the first point corresponds to detection of the first finger being in contact with a surface and the second point corresponds to detection of the second finger being in contact with the surface, and the method further comprises:
    determining a sign of the cross product, wherein the sign of the cross product indicates whether the hand is a right hand or a left hand.

14. The method of claim 6, further comprising:
    displaying a graphical user interface based on positions of the points and information identifying which fingers of the hand correspond to the points.

15. The method of claim 14, wherein displaying the graphical user interface comprises displaying a virtual joystick at a position corresponding to the thumb.

16. The method of claim 14, wherein displaying the graphical user interface comprises displaying a button at a position corresponding to an index finger and/or at a position corresponding to a middle finger.

17. The method of claim 14, further comprising moving a position at which the graphical user interface is displayed to track movement of the hand.

18. The method of claim 14, wherein displaying the graphical user interface comprises displaying at least a portion of a virtual keyboard.

19. The method of claim 14, further comprising:
determining whether the hand is a right hand or a left hand; and
- if the hand is a right hand, displaying one or more controls to the left of a position between the thumb and an index finger of the right hand;
- if the hand is a left hand, displaying one or more controls to the right of a position between the thumb and an index finger of the left hand.

20. The method of claim 14, further comprising:
determining whether the hand is a right hand or a left hand; and
- if the hand is a right hand, displaying a video display to the left of a position between the thumb and an index finger of the right hand;
- if the hand is a left hand, displaying a video display to the right of a position between the thumb and an index finger of the left hand.

21. The method of claim 14, further comprising:
displaying a circle around the hand.

\* \* \* \* \*

UNITED STATES PATENT AND TRADEMARK OFFICE
CERTIFICATE OF CORRECTION

PATENT NO. : 9,013,430 B2  
APPLICATION NO. : 13/818007  
DATED : April 21, 2015  
INVENTOR(S) : Eric McCann et al.

Page 1 of 1

It is certified that error appears in the above-identified patent and that said Letters Patent is hereby corrected as shown below:

In the Specification:

At column 10, line 61, the word "minor" should read -- mirror --.

In the Claims:

At column 24, line 51, "claim 6" should read -- claim 4 --.

Signed and Sealed this
Eleventh Day of August, 2015

Michelle K. Lee
*Director of the United States Patent and Trademark Office*